(12) United States Patent
Ichikawa et al.

(10) Patent No.: US 12,404,656 B2
(45) Date of Patent: Sep. 2, 2025

(54) WORK VEHICLE AND CONTROL METHOD FOR WORK VEHICLE

(71) Applicant: Komatsu Ltd., Tokyo (JP)

(72) Inventors: Kazuki Ichikawa, Tokyo (JP); Masaaki Imaizumi, Tokyo (JP); Ken Hirabayashi, Tokyo (JP); Kento Niiyama, Tokyo (JP)

(73) Assignee: KOMATSU LTD., Tokyo (JP)

( * ) Notice: Subject to any disclaimer, the term of this patent is extended or adjusted under 35 U.S.C. 154(b) by 149 days.

(21) Appl. No.: 18/036,266

(22) PCT Filed: Nov. 1, 2021

(86) PCT No.: PCT/JP2021/040224
§ 371 (c)(1),
(2) Date: May 10, 2023

(87) PCT Pub. No.: WO2022/118587
PCT Pub. Date: Jun. 9, 2022

(65) Prior Publication Data
US 2023/0407598 A1 Dec. 21, 2023

(30) Foreign Application Priority Data
Dec. 4, 2020 (JP) .................................. 2020-202064

(51) Int. Cl.
*E02F 9/22* (2006.01)
*E02F 3/28* (2006.01)
(Continued)

(52) U.S. Cl.
CPC ............ *E02F 9/2253* (2013.01); *E02F 3/283* (2013.01); *E02F 3/431* (2013.01); *E02F 3/434* (2013.01); *F16D 48/066* (2013.01)

(58) Field of Classification Search
CPC .......... E02F 3/283; E02F 3/432; E02F 3/434; F16D 48/066; F16D 2500/10437;
(Continued)

(56) References Cited

U.S. PATENT DOCUMENTS 8,463,509 B2  6/2013  Saito
8,571,763 B2  10/2013  Saito et al.
(Continued)

FOREIGN PATENT DOCUMENTS

CN  101821457 A  9/2010
CN  102037193 A  4/2011
(Continued)

OTHER PUBLICATIONS

Extended European Search Report dated Sep. 10, 2024, issued in the corresponding European patent application No. 21900342.3.
(Continued)

*Primary Examiner* — Timothy Hannon
(74) *Attorney, Agent, or Firm* — Troutman Pepper Locke LLP

(57) ABSTRACT

A work vehicle includes a power source, a travel device that includes a clutch capable of adjusting a degree of engagement between the power source and a transmission, and travels on a basis of power transmitted from the power source, working equipment, a drive device that operates the working equipment on a basis of power transmitted from the power source, and a control device that outputs a control command for controlling the degree of engagement of the clutch on a basis of a state of the working equipment.

5 Claims, 11 Drawing Sheets

(51) Int. Cl.
*E02F 3/43* (2006.01)
*F16D 48/06* (2006.01)

(58) Field of Classification Search
CPC ....... F16D 2500/3128; F16D 2500/316; F16D 2500/502; F16D 2500/50287
See application file for complete search history.

(56) References Cited

U.S. PATENT DOCUMENTS

| | | | |
|---|---|---|---|
| 8,977,444 | B2 | 3/2015 | Fukuhara et al. |
| 9,085,294 | B2 | 7/2015 | Jang |
| 9,085,874 | B2 | 7/2015 | Saito |
| 11,293,164 | B2 | 4/2022 | Enomoto et al. |
| 2010/0114440 | A1 | 5/2010 | Lin et al. |
| 2010/0131158 | A1 | 5/2010 | Saito |
| 2011/0004378 | A1 | 1/2011 | Saito |
| 2011/0318156 | A1 | 12/2011 | Saito et al. |
| 2012/0003070 | A1* | 1/2012 | Tochizawa .............. E02F 9/202 701/50 |
| 2012/0296530 | A1* | 11/2012 | Hyodo ................ E02F 9/2079 701/50 |
| 2012/0310493 | A1 | 12/2012 | Fukuhara et al. |
| 2013/0261908 | A1 | 10/2013 | Jang |
| 2014/0129093 | A1 | 5/2014 | Shirao et al. |
| 2016/0040391 | A1 | 2/2016 | Imaizumi et al. |
| 2017/0298591 | A1 | 10/2017 | Imaizumi et al. |
| 2019/0112788 | A1 | 4/2019 | Enomoto et al. |
| 2020/0299923 | A1 | 9/2020 | Enomoto et al. |

FOREIGN PATENT DOCUMENTS

| | | |
|---|---|---|
| CN | 102414374 A | 4/2012 |
| CN | 102753867 A | 10/2012 |
| CN | 103270346 A | 8/2013 |
| CN | 108779845 A | 11/2018 |
| JP | H11-181841 A | 7/1999 |
| JP | 2008-248523 A | 10/2008 |
| JP | 5228132 B1 | 7/2013 |
| JP | 2018-31458 A | 3/2018 |
| KR | 20160133320 A | 11/2016 |
| WO | 2015/004809 A1 | 1/2015 |
| WO | 2016/152994 A1 | 9/2016 |

OTHER PUBLICATIONS

Office Action dated Jun. 27, 2025, issued for the corresponding CN202180077744.1 and English translation thereof.

* cited by examiner

FIG.1
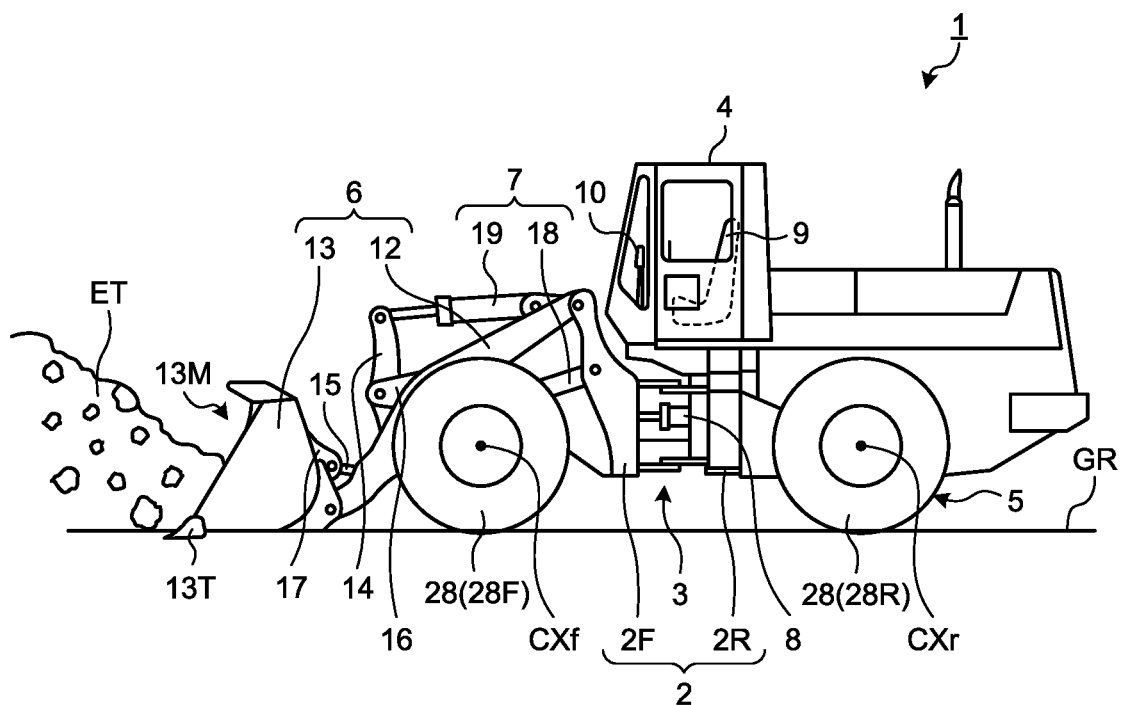
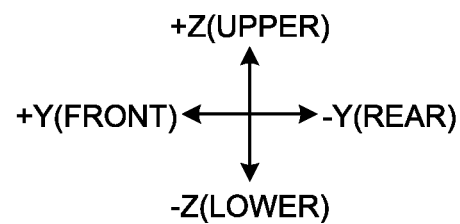

FIG.2
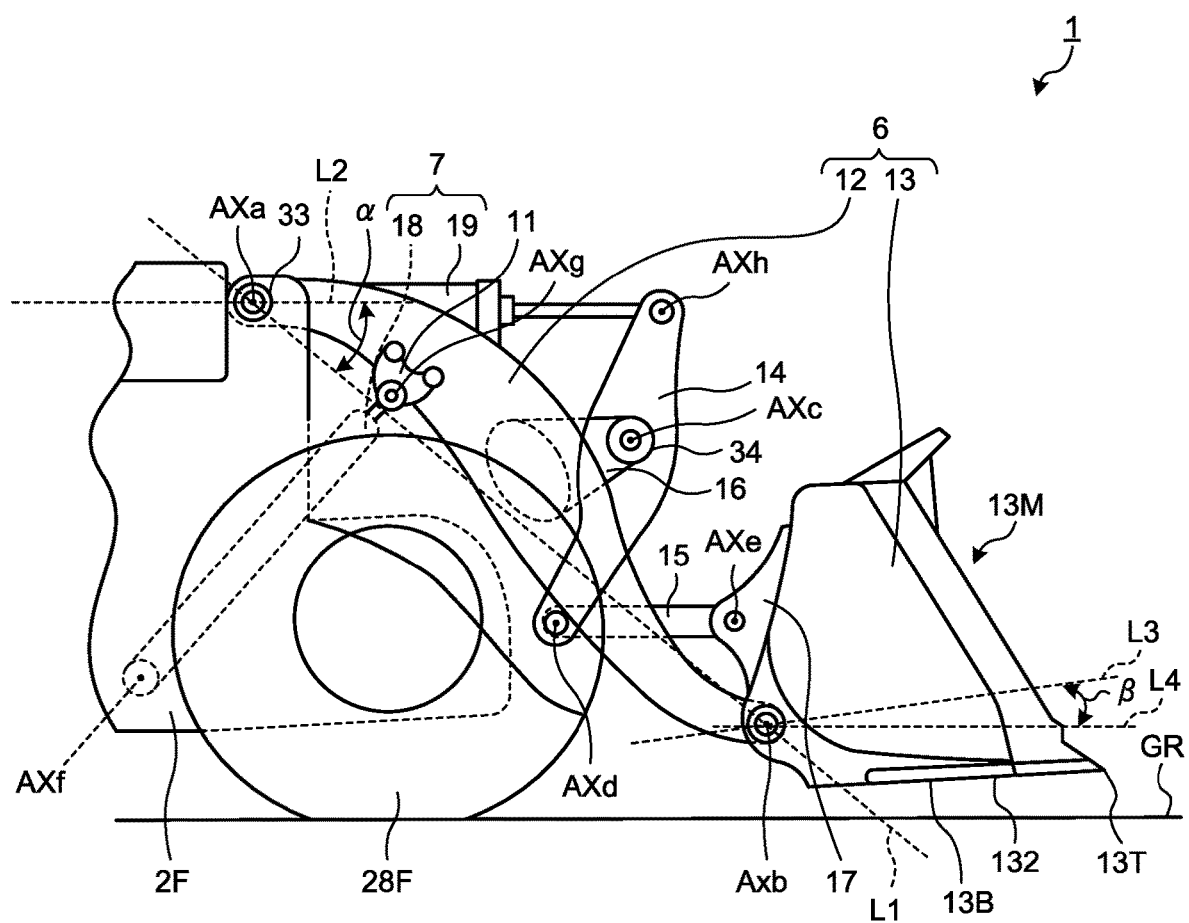
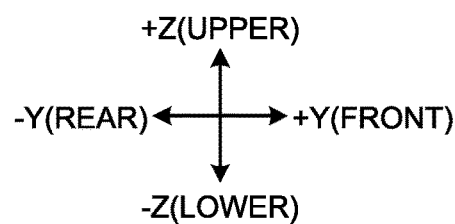

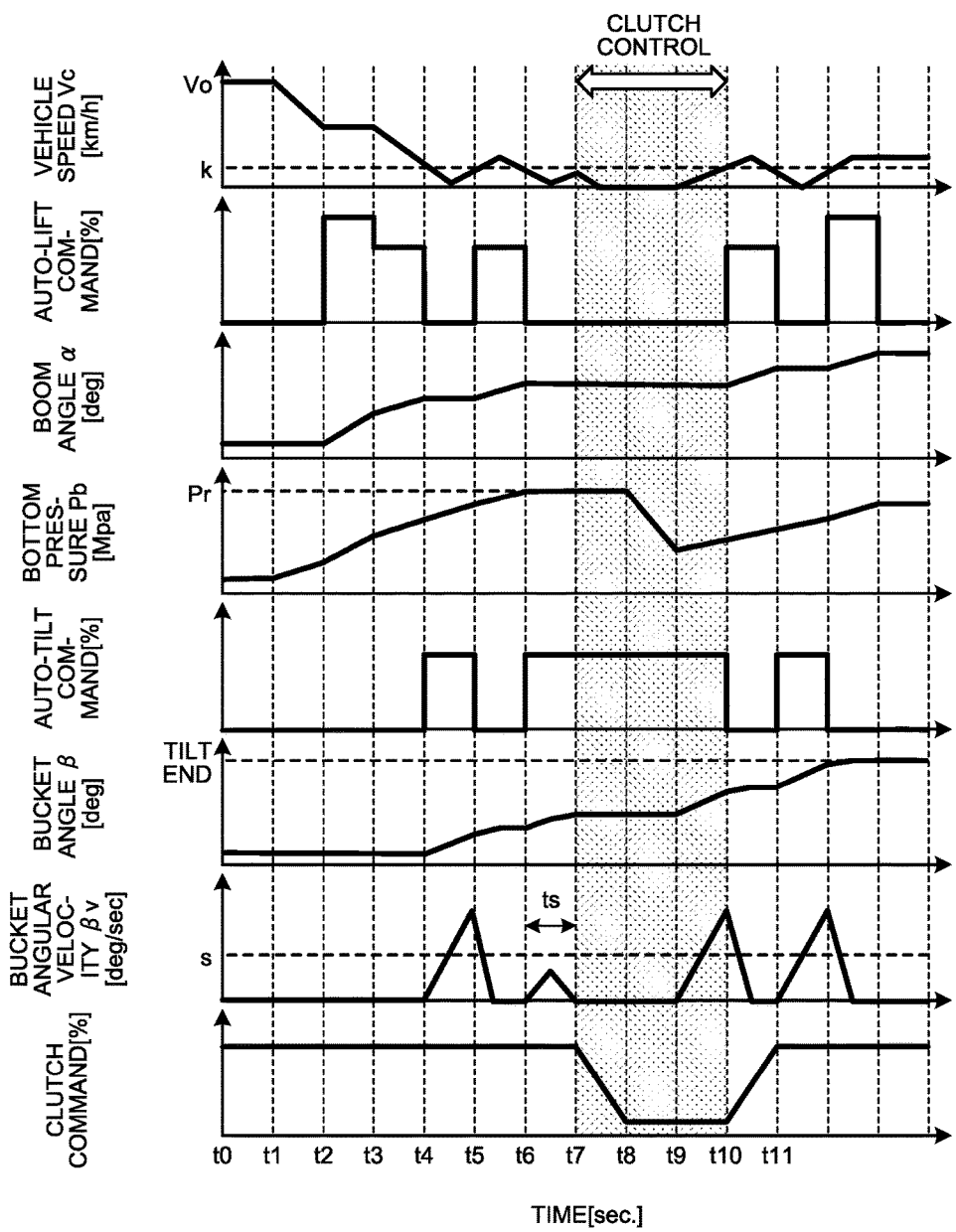

WORK VEHICLE AND CONTROL METHOD FOR WORK VEHICLE

FIELD

The present disclosure relates to a work vehicle and a control method for a work vehicle.

BACKGROUND

In a technical field related to a work vehicle, a wheel loader that automatically excavates a target as disclosed in Patent Literature 1 is known.

CITATION LIST

Patent Literature

Patent Literature 1: WO 2015/004809 A

SUMMARY

Technical Problem

When excavating the target, the wheel loader moves forward toward the target and inserts at least a part of working equipment into the target. For example, in a case where the working equipment is strongly pressed against the target by the forward movement of the wheel loader, a situation in which the wheel loader cannot move may occur. When the situation in which the wheel loader cannot move occurs, work efficiency of the wheel loader is lowered.

An object of the present disclosure is for a work vehicle to get out of a situation of being unable to move in excavation of a target.

Solution to Problem

According to an aspect of the present invention, a work vehicle comprises: a power source; a travel device that includes a clutch capable of adjusting a degree of engagement between the power source and a transmission, and travels on a basis of power transmitted from the power source; working equipment; a drive device that operates the working equipment on a basis of power transmitted from the power source; and a control device that outputs a control command for controlling the degree of engagement of the clutch on a basis of a state of the working equipment.

Advantageous Effects of Invention

According to the present disclosure, a work vehicle can get out of a situation of being unable to move in excavation of a target.

BRIEF DESCRIPTION OF DRAWINGS

FIG. 1 is a side view illustrating a work vehicle according to an embodiment.

FIG. 2 is a diagram illustrating working equipment and a drive device according to the embodiment.

FIG. 7(A) to FIG. 7(H) are timing charts illustrating a control method for the work vehicle according to the embodiment.

DESCRIPTION OF EMBODIMENTS

Figure 3:
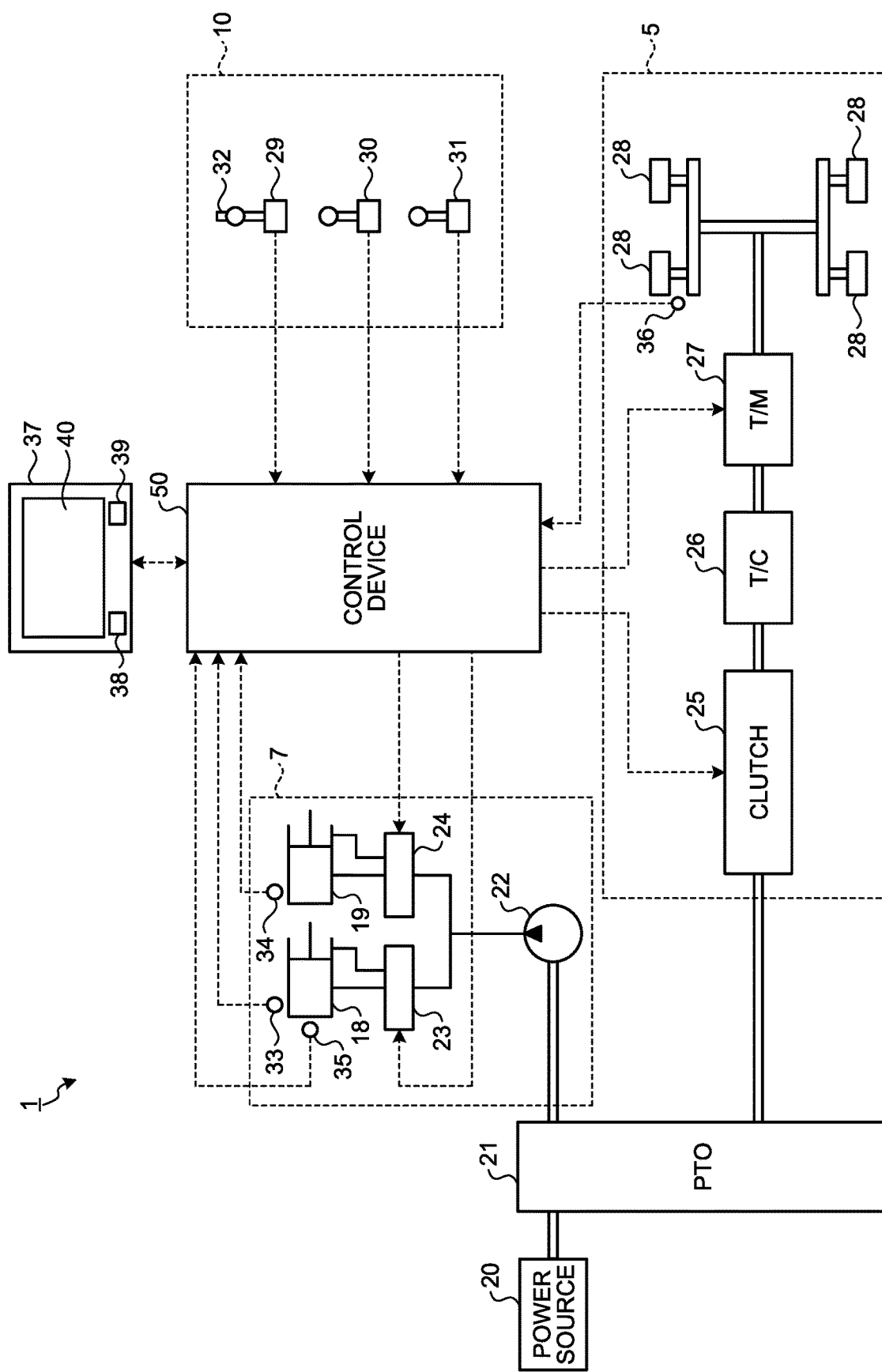
FIG. 3 is a configuration diagram illustrating the work vehicle according to the embodiment.

Embodiments of the present disclosure will be described below with reference to the drawings, and the present disclosure is not limited to these embodiments. Components of each of the embodiments described below can arbitrarily be combined. Also, some components may not be used.

In the embodiments, a local coordinate system is set in a work vehicle 1, and the positional relationship of the respective parts will be described with reference to the local coordinate system. In the local coordinate system, a direction extending in the right-left direction (vehicle width direction) as viewed from an operator on the work vehicle 1 is defined as a direction of an X axis, a direction extending in the front-rear direction of the work vehicle 1 is defined as a direction of a Y axis, and a direction extending in the up-down direction of the work vehicle 1 is defined as a direction of a Z axis. A+X direction is the right direction, and a −X direction is the left direction. A+Y direction is the front direction, and a −Y direction is the rear direction. A+Z direction is the upper direction, and a −Z direction is the lower direction.

[Wheel Loader]

FIG. 1 is a side view illustrating the work vehicle 1 according to an embodiment. In the embodiment, the work vehicle 1 is a wheel loader. In the embodiment, the work vehicle 1 is referred to as a wheel loader 1 as needed.

As illustrated in FIG. 1, the wheel loader 1 includes a vehicle body 2, an articulation mechanism 3, a cab 4, a travel device 5, working equipment 6, and a drive device 7. The wheel loader 1 travels through the work site by means of the travel device 5. The wheel loader 1 performs work using the working equipment 6 at the work site.

The vehicle body 2 supports the working equipment 6. The vehicle body 2 includes a vehicle body front portion 2F and a vehicle body rear portion 2R. The vehicle body front portion 2F is disposed further on the front side than the vehicle body rear portion 2R. The vehicle body front portion 2F and the vehicle body rear portion 2R are connected by the articulation mechanism 3. The articulation mechanism 3 includes an articulation cylinder 8. The articulation cylinder 8 is a hydraulic cylinder. The articulation cylinder 8 connects the vehicle body front portion 2F to the vehicle body rear portion 2R. When the articulation cylinder 8 extends and retracts, the vehicle body front portion 2F is bent in the right-left direction with respect to the vehicle body rear portion 2R. When the vehicle body front portion 2F is bent with respect to the vehicle body rear portion 2R, the traveling direction of the wheel loader 1 is adjusted.

The cab 4 is supported by the vehicle body 2. In the embodiment, the cab 4 is disposed on the upper portion of the vehicle body rear portion 2R. Inside the cab 4, a seat 9 and an operation lever 10 are disposed. The operator sits on the seat 9. The operation lever 10 is operated by the operator. The operation lever 10 is disposed around the seat 9.

The travel device 5 travels on a ground GR of the work site. The travel device 5 supports the vehicle body 2. The travel device 5 includes a wheel 28. The wheel 28 includes a front wheel 28F attached to the vehicle body front portion 2F and a rear wheel 28R attached to the vehicle body rear portion 2R. The wheel 28 comes into contact with the ground GR. When the wheel 28 rotates, the wheel loader 1 travels.

In the embodiment, the X axis is parallel to a rotation axis CXf of the front wheel 28F. The Z axis is orthogonal to the ground contact surface of the front wheel 28F in contact with the ground GR. When the wheel loader 1 travels in a straight state, the rotation axis CXf of the front wheel 28F and a rotation axis CXr of the rear wheel 28R are parallel to each other.

The working equipment 6 performs work. Examples of the work performed by the working equipment 6 include excavation work, loading work, transportation work, and snow removal work. In the embodiment, the working equipment 6 excavates a target ET. An example of the target ET is a natural ground placed on the ground GR.

FIG. 2 is a diagram illustrating the working equipment 6 and the drive device 7 according to the embodiment. As illustrated in FIGS. 1 and 2, the working equipment 6 is connected to the vehicle body front portion 2F. The working equipment 6 includes a boom 12 and a bucket 13. The working equipment 6 includes a bell crank 14 and a bucket link 15. The drive device 7 operates the working equipment 6. The drive device 7 includes a boom cylinder 18 and a bucket cylinder 19. The boom cylinder 18 is a hydraulic cylinder. The bucket cylinder 19 is a hydraulic cylinder.

The base end portion of the boom 12 is turnably connected to the vehicle body front portion 2F. The boom 12 turns about a turning axis AXa with respect to the vehicle body front portion 2F. A bracket 16 is secured to the middle portion of the boom 12.

The bucket 13 is a work member that excavates the target ET. The bucket 13 holds an excavated object. The bucket 13 has a bottom plate portion 13B. A blade tip portion 13T is provided at the tip portion of the bottom plate portion 13B. The blade tip portion 13T extends in the right-left direction. The bucket 13 has an opening portion 13M.

The base end portion of the bucket 13 is turnably connected to the tip end portion of the boom 12. The bucket 13 turns about a turning axis AXb with respect to the boom 12. The bucket 13 is disposed further on the front side than the front wheel 28F. A bracket 17 is secured to a part of the bucket 13.

The middle portion of the bell crank 14 is turnably connected to the bracket 16 of the boom 12. The bell crank 14 turns about a turning axis AXc with respect to the bracket 16 of the boom 12.

The base end portion of the bucket link 15 is turnably connected to the lower end portion of the bell crank 14. The bucket link 15 turns about a turning axis AXd with respect to the bell crank 14. The tip end portion of the bucket link 15 is turnably connected to the bracket 17 of the bucket 13. The bucket link 15 turns about a turning axis AXe with respect to the bracket 17 of the bucket 13. The bell crank 14 is connected to the bucket 13 via the bucket link 15.

The boom cylinder 18 operates the boom 12. The base end portion of the boom cylinder 18 is connected to the vehicle body front portion 2F. The base end portion of the boom cylinder 18 turns about a turning axis AXf with respect to the vehicle body front portion 2F. A bracket 11 is secured to the boom 12. The tip end portion of the boom cylinder 18 is connected to the bracket 11 of the boom 12. The boom 12 turns about a turning axis AXg with respect to the boom cylinder 18.

The bucket cylinder 19 operates the bucket 13. The base end portion of the bucket cylinder 19 is connected to the vehicle body front portion 2F. The tip end portion of the bucket cylinder 19 is connected to the upper end portion of the bell crank 14. The bell crank 14 turns about a turning axis AXh with respect to the bucket cylinder 19.

[Operation of Working Equipment]

The working equipment 6 is front-loading-type working equipment in which the opening portion 13M of the bucket 13 faces to the front side in the excavation work. When the boom cylinder 18 extends and retracts, the boom 12 performs a raising operation or a lowering operation. When the bucket cylinder 19 extends and retracts, the bucket 13 performs a tilt operation or a dumping operation. The excavated object scooped by the blade tip portion 13T enters the inside of the bucket 13 through the opening portion 13M.

The raising operation of the boom 12 refers to an operation in which the boom 12 turns about the turning axis AXa such that the tip end portion of the boom 12 is away from the ground GR. The lowering operation of the boom 12 refers to an operation in which the boom 12 turns about the turning axis AXa such that the tip end portion of the boom 12 approaches the ground GR.

When the boom cylinder 18 extends, the boom 12 performs the raising operation. When the boom cylinder 18 retracts, the boom 12 performs the lowering operation.

The tilt operation of the bucket 13 refers to an operation in which the bucket 13 turns about the turning axis AXb such that the opening portion 13M of the bucket 13 faces upward and the blade tip portion 13T is away from the ground GR. The dumping operation of the bucket 13 refers to an operation in which the bucket 13 turns about the turning axis AXb such that the opening portion 13M of the bucket 13 faces downward and the blade tip portion 13T approaches the ground GR.

When the bucket cylinder 19 extends, the bell crank 14 turns such that the upper end portion of the bell crank 14 moves to the front side and the lower end portion of the bell crank 14 moves to the rear side. When the lower end portion of the bell crank 14 moves to the rear side, the bucket 13 is pulled to the rear side by the bucket link 15 and performs the tilt operation. When the bucket cylinder 19 retracts, the bell crank 14 turns such that the upper end portion of the bell crank 14 moves to the rear side and the lower end portion of the bell crank 14 moves to the front side. When the lower end portion of the bell crank 14 moves to the front side, the bucket 13 is pushed to the front side by the bucket link 15 and performs the dumping operation.

When the bucket 13 performs the tilt operation, the excavated object is scooped by the bucket 13 and held in the bucket 13. When the bucket 13 performs the dumping operation, the excavated object held in the bucket 13 is discharged from the bucket 13.

[Configuration of Work Vehicle]

FIG. 3 is a configuration diagram illustrating the wheel loader 1 according to the embodiment. As illustrated in FIG. 3, the wheel loader 1 includes a power source 20, a power take-off (PTO) 21, the travel device 5, the drive device 7, the operation lever 10, and a control device 50.

The power source 20 is, for example, a diesel engine. The power source 20 generates power.

The power take-off 21 is connected to the power source 20. The power take-off 21 distributes power from the power source 20 to the travel device 5 and the drive device 7. At least part of the power generated in the power source 20 is transmitted to the travel device 5 via the power take-off 21. At least part of the power generated by the power source 20 is transmitted to the drive device 7 via the power take-off 21.

The drive device 7 operates the working equipment 6 using the power transmitted from the power source 20 via the power take-off 21. The drive device 7 includes a hydraulic pump 22, a boom control valve 23, a bucket control valve 24, the boom cylinder 18, and the bucket cylinder 19.

The hydraulic pump 22 is connected to the power take-off 21. The hydraulic pump 22 discharges hydraulic oil using the power transmitted from the power source 20. At least part of the hydraulic oil discharged from the hydraulic pump 22 is supplied to the boom cylinder 18 via the boom control valve 23. At least part of the hydraulic oil discharged from the hydraulic pump 22 is supplied to the bucket cylinder 19 via the bucket control valve 24.

The boom control valve 23 controls a direction and a flow rate of hydraulic oil supplied from the hydraulic pump 22 to the boom cylinder 18. When the direction of the hydraulic oil supplied to the boom cylinder 18 is controlled by the boom control valve 23, the boom cylinder 18 extends and retracts, and the boom 12 performs the raising operation or the lowering operation. When the flow rate of the hydraulic oil supplied to the boom cylinder 18 is controlled by the boom control valve 23, the boom cylinder speed indicating the extension/retraction speed of the boom cylinder 18 is controlled, and the movement speed of the boom 12 is controlled. The movement speed of the boom 12 includes the angular velocity of the boom 12 about the turning axis AXa when the boom 12 performs the raising operation and the angular velocity of the boom 12 about the turning axis AXa when the boom 12 performs the lowering operation.

The bucket control valve 24 controls a direction and a flow rate of hydraulic oil supplied from the hydraulic pump 22 to the bucket cylinder 19. When the direction of the hydraulic oil supplied to the bucket cylinder 19 is controlled by the bucket control valve 24, the bucket cylinder 19 extends and retracts, and the bucket 13 performs the tilt operation or the dumping operation. When the flow rate of the hydraulic oil supplied to the bucket cylinder 19 is controlled by the bucket control valve 24, the bucket cylinder speed indicating the extension/retraction speed of the bucket cylinder 19 is controlled, and the movement speed of the bucket 13 is controlled. The movement speed of the bucket 13 includes the angular velocity of the bucket 13 about the turning axis AXb when the bucket 13 performs the tilt operation and the angular velocity of the bucket 13 about the turning axis AXb when the bucket 13 performs the dumping operation.

The travel device 5 travels using the power transmitted from the power source 20 via the power take-off 21. The travel device 5 includes a clutch 25, a torque converter 26, a transmission 27, and the wheels 28. The power generated in the power source 20 is transmitted to the wheels 28 via the clutch 25, the torque converter 26, and the transmission 27. The power generated in the power source 20 is transmitted to the wheels 28, and the wheels 28 rotate, whereby the travel device 5 travels.

The clutch 25 is disposed between the power source 20 and the transmission 27. The clutch 25 is connected to the power take-off 21. In the embodiment, the clutch 25 is disposed between the power take-off 21 and the torque converter 26. The clutch 25 is a wet-type multi-disc hydraulic clutch capable of adjusting the degree of engagement between the input shaft side and the output shaft side. The clutch 25 includes an input side member and an output side member.

The degree of engagement of the clutch 25 changes with the clutch pressure applied to the clutch 25. The clutch pressure refers to the pressure of the hydraulic oil applied to the input side member and the output side member of the clutch 25. As the degree of engagement of the clutch 25 is changed, the power transmitted from the power take-off 21 to the torque converter 26 changes.

The degree of engagement of the clutch 25 is adjusted between 0[%] and 100[%]. When the clutch pressure is minimum, the degree of engagement is 0[%]. As the clutch pressure increases, the degree of engagement increases. When the clutch pressure is maximum, the degree of engagement is 100[%]. The state in which the degree of engagement is 0[%] is an open state in which the input side member and the output side member are not engaged and the power from the power take-off 21 to the travel device 5 is not transmitted to the torque converter 26. The state in which the degree of engagement is 100[%] is a complete engagement state in which the input side member and the output side member are engaged and all the power from the power take-off 21 to the travel device 5 is transmitted to the torque converter 26. The state in which the degree of engagement is higher than 0[%] and lower than 100[%] is a partial engagement state in which the input side member and the output side member slip relative to each other and part of the power from the power take-off 21 is thus transmitted to the torque converter 26. As the degree of engagement of the clutch 25 is adjusted, the transmission rate of the power transmitted from the power take-off 21 to the torque converter 26 is adjusted.

The torque converter 26 is disposed between the clutch 25 and the transmission 27.

The transmission 27 includes a plurality of speed clutches and a plurality of direction switching clutches. By selectively engaging or disengaging the plurality of speed clutches with or from each other, the speed stage of the transmission 27 is changed. By selectively engaging or disengaging the plurality of direction switching clutches with or from each other, forward movement and backward movement of the travel device 5 are switched.

The operation lever 10 includes a boom operation lever 29, a bucket operation lever 30, and a selector lever 31. When the boom operation lever 29 is operated by the operator, the boom 12 operates. When the bucket operation lever 30 is operated by the operator, the bucket 13 operates. When the selector lever 31 is operated by the operator, the speed stage of the transmission 27 is changed.

When the boom operation lever 29 is operated, a boom operation signal is transmitted from the boom operation lever 29 to the control device 50. The control device 50 controls the boom control valve 23 on the basis of the boom operation signal from the boom operation lever 29. When the boom control valve 23 is controlled, the boom cylinder 18 extends and retracts, and the boom 12 is operated. When the bucket operation lever 30 is operated, a bucket operation signal is transmitted from the bucket operation lever 30 to the control device 50. The control device 50 controls the bucket control valve 24 on the basis of the bucket operation signal from the bucket operation lever 30. When the bucket control valve 24 is controlled, the bucket cylinder 19 extends and retracts, and the bucket 13 is operated.

When the selector lever 31 is operated, a speed stage operation signal is transmitted from the selector lever 31 to the control device 50. The control device 50 changes the speed stage of the transmission 27 on the basis of the speed stage operation signal from the selector lever 31.

The boom operation lever 29 is provided with a kick-down switch 32. The kick-down switch 32 lowers the speed stage of the transmission 27 in a state where the selector lever 31 is not operated. The low speed stage refers to a speed stage having a large transmission gear ratio.

When the kick-down switch 32 is operated by the operator, a kick-down operation signal is output from the kick-down switch 32 to the control device 50. Based on the kick-down operation signal from the kick-down switch 32, the control device 50 changes the speed stage to a lower speed stage than the speed stage of the transmission 27 at the time when the kick-down operation signal is acquired. For example, in a case where the speed stage at the time when the kick-down operation signal is acquired is the second speed stage, the control device 50 changes the speed stage of the transmission 27 from the second speed stage to the first speed stage, which is lower than the second speed stage.

The wheel loader 1 also includes a boom angle sensor 33, a bucket angle sensor 34, a pressure sensor 35, and a vehicle speed sensor 36.

The boom angle sensor 33 detects a boom angle $\alpha$ indicating the angle of the boom 12. The boom angle sensor 33 detects the boom angle $\alpha$ with respect to the vehicle body 2 in the local coordinate system. An example of the boom angle sensor 33 is a potentiometer disposed at the connection portion between the vehicle body front portion 2F and the boom 12. As illustrated in FIG. 2, the boom angle $\alpha$ is an angle formed by a line L1 connecting the turning axis AXa to the turning axis AXb and a line L2 passing through the turning axis AXa and parallel to the line connecting the rotation axis CXf to the rotation axis CXr. In the embodiment, in a case where the boom 12 is inclined further to the ground GR than the line L2, the boom angle $\alpha$ is a negative value. When the boom 12 is raised, the boom angle $\alpha$ increases. The detection data of the boom angle sensor 33 is output to the control device 50. The control device 50 can calculate a boom angular velocity $\alpha v$ indicating the angular velocity of the boom 12 about the turning axis AXa on the basis of the detection data of the boom angle sensor 33. That is, the boom angle sensor 33 can function as an angular velocity sensor that detects the boom angular velocity $\alpha v$. Note that the boom angle sensor 33 may be a stroke sensor that detects the stroke of the boom cylinder 18.

The bucket angle sensor 34 detects a bucket angle $\beta$ indicating the angle of the bucket 13. The bucket angle sensor 34 detects a bell crank angle indicating the angle of the bell crank 14 with respect to the boom 12 in the local coordinate system. An example of the bucket angle sensor 34 is a potentiometer disposed at the connection portion between the boom 12 and the bell crank 14. The bucket angle sensor 34 detects a bell crank angle that is an angle formed by the boom 12 and the bell crank 14. The bell crank angle and the bucket angle $\beta$ correspond to each other on a one-to-one basis. As the bell crank angle is detected, the bucket angle $\beta$ is detected. As illustrated in FIG. 2, the bucket angle $\beta$ is an angle formed by a line L3 passing through the turning axis AXb and parallel to a bottom surface 132 of the bucket 13 and a line L4 passing through the turning axis AXb and parallel to the line L2. In the embodiment, in a case where the line L3 is inclined further to the ground GR than the line L4, the bucket angle $\beta$ is a negative value. When the bucket 13 performs the tilt operation, the bucket angle $\beta$ increases. The detection data of the bucket angle sensor 34 is output to the control device 50.

The control device 50 can calculate a bucket angular velocity $\beta v$ indicating the angular velocity of the bucket 13 about the turning axis AXb on the basis of the detection data of the bucket angle sensor 34. That is, the bucket angle sensor 34 can function as an angular velocity sensor that detects the bucket angular velocity $\beta v$. Note that the bucket angle sensor 34 may be a stroke sensor that detects the stroke of the bucket cylinder 19.

The pressure sensor 35 detects the pressure of the hydraulic oil in the boom cylinder 18. The pressure of the hydraulic oil in the boom cylinder 18 includes bottom pressure Pb of the boom cylinder 18. The detection data of the pressure sensor 35 is output to the control device 50.

The vehicle speed sensor 36 detects a vehicle speed Vc indicating the traveling speed of the travel device 5. The detection data of the vehicle speed sensor 36 is output to the control device 50.

The wheel loader 1 also includes an interface device 37. The interface device 37 is disposed inside the cab 4.

The interface device 37 includes an auto-excavation start switch 38, a sound output unit 39, and a display unit 40. The sound output unit 39 outputs, for example, a warning sound. The display unit 40 displays display data related to the state or control of the working equipment 6.

[Control System]

Figure 4:
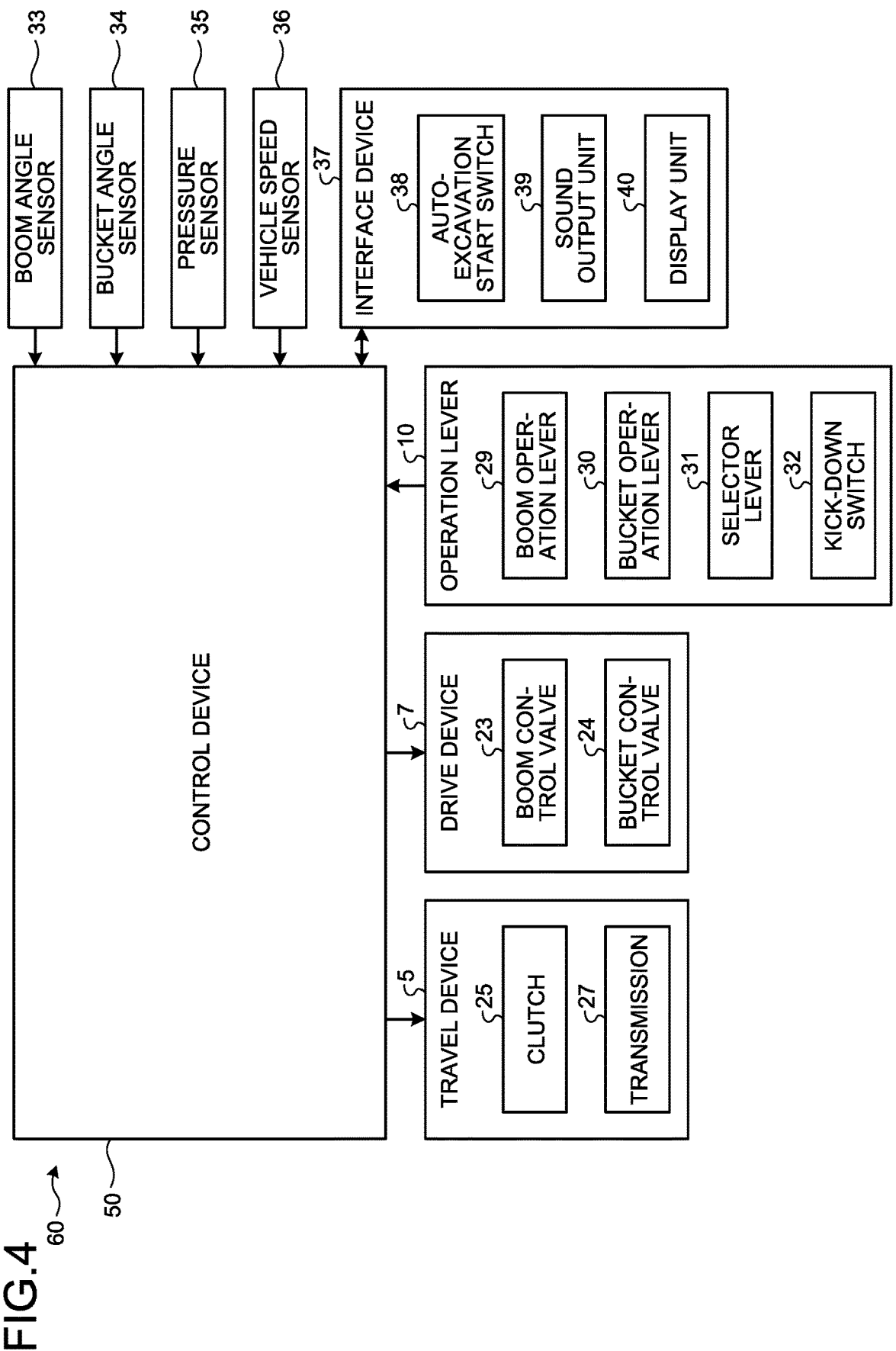
FIG. 4 is a functional block diagram illustrating a control system of the work vehicle according to the embodiment.

FIG. 4 is a functional block diagram illustrating a control system 60 of the wheel loader 1 according to the embodiment. The control system 60 includes the control device 50, the operation lever 10, the travel device 5, the drive device 7, the boom angle sensor 33, the bucket angle sensor 34, the pressure sensor 35, the vehicle speed sensor 36, and the interface device 37.

The control device 50 includes a computer system. The control device 50 outputs a control command for controlling the wheel loader 1.

Figure 5:
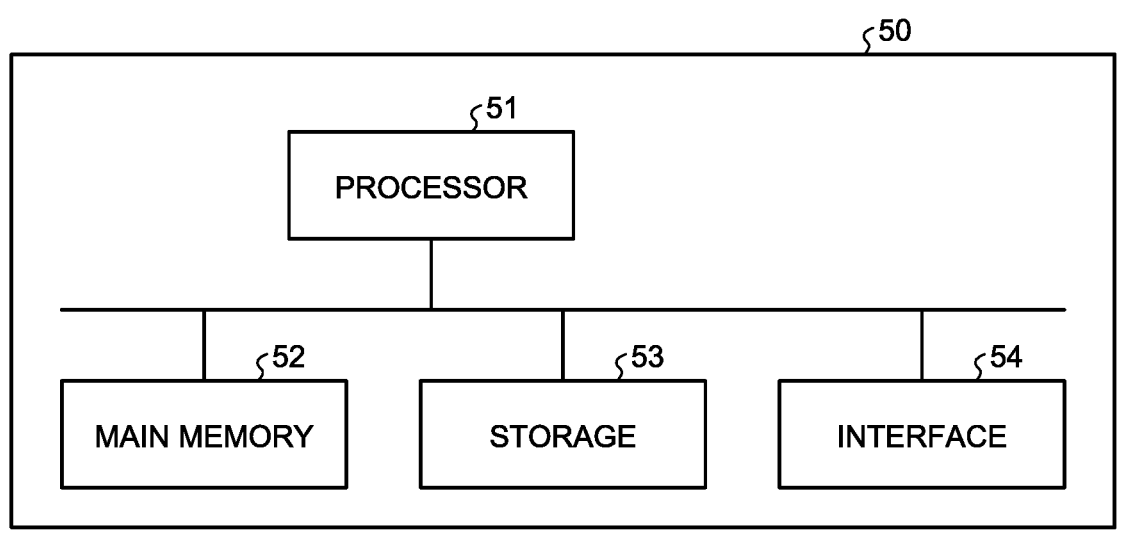
FIG. 5 is a block diagram illustrating a control device of the work vehicle according to the embodiment.

FIG. 5 is a block diagram illustrating the control device 50 of the wheel loader 1 according to the embodiment. As illustrated in FIG. 5, the control device includes a processor 51, a main memory 52, a storage 53, and an interface 54. The processor 51 executes a computer program to perform arithmetic processing of the operation of the working equipment 6. Examples of the processor 51 include a central processing unit (CPU) and a micro processing unit (MPU). Examples of the main memory 52 include a nonvolatile memory and a volatile memory. An example of the nonvolatile memory is a read only memory (ROM). An example of the volatile memory is a random access memory (RAM). The storage 53 is a non-transitory tangible storage medium. Examples of the storage 53 include a magnetic disk, a magneto-optical disk, and a semiconductor memory. The storage 53 may be an internal medium directly connected to the bus of the control device or an external medium connected to the control device 50 via the interface 54 or a communication line. The storage 53 stores a computer program for controlling the working equipment 6.

As illustrated in FIG. 4, the control device 50 individually communicates with the operation lever 10, the travel device 5, the drive device 7, the boom angle sensor 33, the bucket angle sensor 34, the pressure sensor 35, the vehicle speed sensor 36, and the interface device 37.

The control device 50 outputs a control command for controlling the clutch 25 to the clutch 25. The control device 50 outputs a control command for controlling the degree of engagement of the clutch 25 on the basis of the state of the working equipment 6. The state of the working equipment 6 includes the operation speed of the working equipment 6. The operation speed of the working equipment 6 includes the bucket angular velocity βv indicating the angular velocity of the bucket 13. The bucket angular velocity βv is detected by the bucket angle sensor 34. In the embodiment, the control device 50 outputs a control command for controlling the degree of engagement of the clutch 25 on the basis of the detection data of the bucket angle sensor 34.

In the embodiment, the control command output from the control device 50 to control the degree of engagement of the clutch 25 is referred to as a clutch command as needed.

The control device 50 outputs a control command for controlling the transmission 27 to the transmission 27. The control device 50 outputs a control command for changing the speed stage of the transmission 27. The control device 50 outputs a control command for moving the travel device 5 forward or backward.

In the embodiment, the control command output from the control device 50 to change the speed stage of the transmission 27 is referred to as a speed change command as needed. Also, the control command output from the control device 50 to move the travel device 5 forward is referred to as a forward movement command as needed.

The control device 50 outputs a control command for controlling the working equipment 6 to at least one of the boom control valve 23 and the bucket control valve 24. The control device 50 outputs a control command to the boom control valve 23 so that the boom 12 performs the raising operation or the lowering operation at a predetermined boom angular velocity αv. The control device 50 outputs a control command to the bucket control valve 24 so that the bucket 13 performs the tilt operation or the dumping operation at a predetermined bucket angular velocity βv.

The control device 50 individually controls the sound output unit 39 and the display unit 40 of the interface device 37.

[Automatic Excavation Control]

In the embodiment, the wheel loader 1 performs the excavation work of the target ET using the working equipment 6 in a manual operation mode or an auto-excavation mode. In the manual operation, the working equipment 6 operates as the operator operates at least one of the boom operation lever 29 and the bucket operation lever 30. In the auto-excavation mode, the working equipment 6 operates on the basis of the control command output from the control device 50 without depending on the operation of the boom operation lever 29 and the bucket operation lever 30. The auto-excavation mode reduces the burden on the operator in the excavation operation.

In the auto-excavation mode, the control device performs auto-excavation control of the working equipment 6. The control commands output from the control device 50 in the auto-excavation control include an auto-lift command for causing the boom 12 to perform a lift operation and an auto-tilt command for causing the bucket 13 to perform a tilt operation.

In the embodiment, the lift operation of the boom 12 in response to the auto-lift command is referred to as an auto-lift operation as needed, and the tilt operation of the bucket 13 in response to the auto-tilt command is referred to as an auto-tilt operation as needed.

DESCRIPTION OF EMBODIMENTS

Figure 6A:
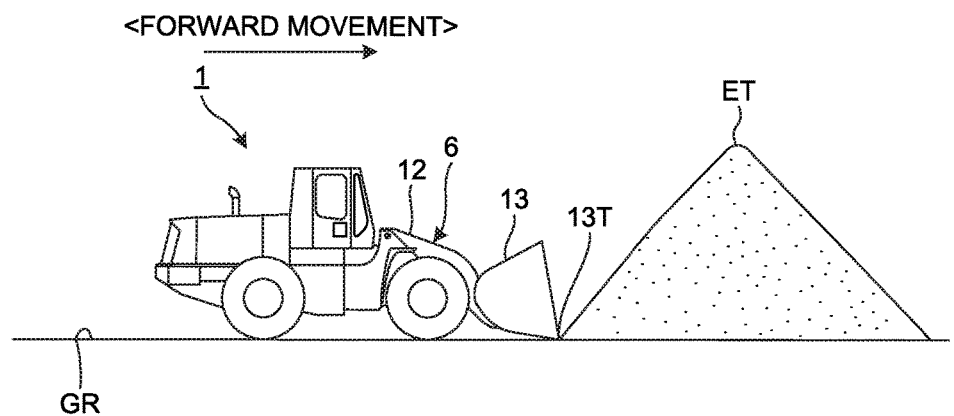
FIG. 6(A) and FIG. 6(B) are views for explaining an excavation operation of the work vehicle according to the embodiment.
Figure 6B:
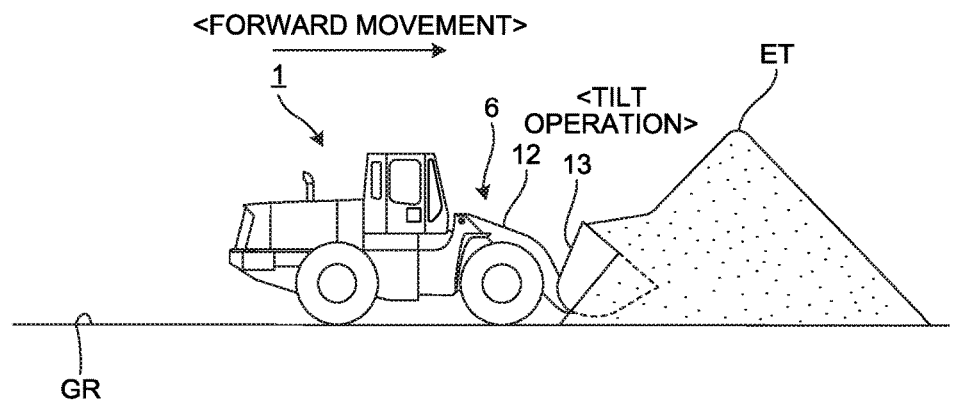

FIG. 6(A) and FIG. 6(B) are views for explaining an excavation operation of the wheel loader 1 according to the embodiment. As illustrated in FIG. 6(A), in the excavation operation, the wheel loader 1 moves forward so as to approach the target ET. When the wheel loader 1 moves forward, the posture of the working equipment 6 is adjusted so that the bucket 13 excavates the target ET. In the embodiment, the posture of the working equipment 6 is adjusted so that the blade tip portion 13T of the bucket 13 gets close to or comes into contact with the ground GR. When the wheel loader 1 moves forward in a state where the blade tip portion 13T is close to or in contact with the ground GR, the blade tip portion 13T of the bucket 13 is inserted into the lower end portion of the target ET.

To start the auto-excavation control, the operator operates the auto-excavation start switch 38 of the interface device 37. When the auto-excavation start switch 38 is operated by the operator, an auto-excavation start signal is transmitted from the auto-excavation start switch 38 to the control device 50. After acquiring the auto-excavation start signal from the auto-excavation start switch 38, the control device 50 starts the auto-excavation control. The control device 50 causes the display unit 40 to display an indicator indicating that the auto-excavation control is to be performed.

As illustrated in FIG. 6(B), in the auto-excavation control, after the blade tip portion 13T of the bucket 13 is inserted into the target ET, the control device 50 causes the bucket 13 to perform the auto-tilt operation. As a result, the target ET is excavated by the bucket 13. The bucket 13 scoops the excavated object. The excavated object is held in the bucket 13.

In the auto-excavation control, in a case where the bucket 13 inserted into the target ET is caused to perform the auto-tilt operation, the control device 50 starts the auto-tilt operation of the bucket 13 on the basis of the vehicle speed Vc of the travel device 5 and the bottom pressure Pb of the boom cylinder 18. Also, the control device 50 ends the auto-tilt operation on the basis of the vehicle speed Vc of the travel device 5 and the increase amount of the bottom pressure Pb from the time when the auto-tilt operation is started. That is, in the auto-excavation control, the control device 50 starts the auto-tilt operation of the bucket 13 on the basis of the detection data of the vehicle speed sensor 36 and the detection data of the pressure sensor 35. The control device 50 ends the auto-tilt operation on the basis of the detection data of the vehicle speed sensor 36 and the increase amount of the detection value of the pressure sensor 35 from the time point when the auto-tilt operation is started.

Note that, in the auto-excavation control, when the operator operates the kick-down switch 32, the control device 50 changes the speed stage of the transmission 27 to a low speed stage. When the speed stage of the transmission 27 is changed to a low speed stage, the traction force of the wheel loader 1 increases. Since the traction force of the wheel loader 1 increases, the excavation efficiency of the wheel loader 1 is improved.

As described above, in the auto-excavation control, the wheel loader 1 moves forward toward the target ET and inserts the bucket 13 into the target. For example, in a case where the bucket 13 is strongly pressed against the target ET by the forward movement of the wheel loader 1, a situation in which the wheel loader 1 cannot move may occur. That is, in a case where the bucket 13 is strongly pressed against the target ET, a situation in which the working equipment 6 cannot move or a situation in which the travel device 5 cannot move may occur. The situation in which the working equipment 6 cannot move in the auto-excavation control includes a situation in which the bucket 13 cannot perform the auto-tilt operation. The situation in which the travel device 5 cannot move in the auto-excavation control includes a situation in which the wheel 28 moving forward cannot rotate. When a situation in which the wheel loader 1 cannot move occurs, the work efficiency of the wheel loader 1 is lowered.

In the embodiment, in the auto-excavation control, the control device 50 outputs a control command for controlling the degree of engagement of the clutch 25 on the basis of the state of the working equipment 6. The state of the working equipment 6 includes the operation speed of the working equipment 6. The operation speed of the working equipment 6 includes the bucket angular velocity $\beta v$. The bucket angular velocity $\beta v$ is detected by the bucket angle sensor 34. In a case of determining that the bucket 13 and the wheel 28 cannot move on the basis of the detection data of the bucket angle sensor 34, the control device 50 outputs a control command so that the degree of engagement of the clutch 25 decreases.

When the wheel loader 1 moves forward toward the target ET in order to excavate the target ET, the degree of engagement of the clutch 25 is set to a high value (for example, 100[%]). In a case where the degree of engagement of the clutch 25 is maintained at a high value even in a situation where the bucket 13 is strongly pressed against the target ET and the bucket 13 and the wheel 28 cannot move, the state in which the bucket 13 is strongly pressed against the target ET is maintained.

In the embodiment, in a case where the wheel loader 1 cannot move in the auto-excavation control, the degree of engagement of the clutch 25 is decreased. As the degree of engagement of the clutch 25 is decreased, the power transmitted from the power take-off 21 to the wheel 28 is decreased. As a result, the force with which the working equipment 6 is pressed against the target ET is decreased. In addition, since the power transmitted from the power take-off 21 to the wheel 28 is decreased, the traction force of the wheel loader 1 is decreased.

The power take-off 21 distributes power from the power source 20 to the travel device 5 and the drive device 7. As the degree of engagement of the clutch 25 is decreased, the power distributed to the travel device 5 decreases, and the power distributed to the drive device 7 increases. That is, the power for causing the bucket 13 to perform the auto-tilt operation increases. Since the power for causing the bucket 13 to perform the auto-tilt operation increases in a state where the force with which the bucket 13 is pressed against the target ET is decreased, the bucket 13 can perform the auto-tilt operation.

FIG. 7(A) to FIG. 7(H) are timing charts is a timing chart illustrating a control method for the wheel loader 1 according to the embodiment.

A first graph illustrated in FIG. 7(A) illustrates the relationship between the time [sec.] from the start of the auto-excavation control and the vehicle speed Vc [km/h] of the travel device 5. The vehicle speed Vc is detected by the vehicle speed sensor 36.

A second graph illustrated in FIG. 7(B) illustrates the relationship between the time [sec.] from the start of the auto-excavation control and the command value [%] of the auto-lift command output from the control device 50. A state in which the command value of the auto-lift command is 0[%] indicates that the opening degree of the boom control valve 23 for causing the boom 12 to perform the lift operation is in a fully closed state. When the command value of the auto-lift command increases from 0[%], the opening degree of the boom control valve 23 also increases. A state in which the command value of the auto-lift command is 100[%] indicates that the opening degree of the boom control valve 23 for causing the boom 12 to perform the lift operation is in a fully open state. The state in which the command value of the auto-lift command is 0[%] includes a state in which the auto-lift command is not output from the control device 50. The state in which the command value of the auto-lift command is higher than 0[%] includes a state in which the auto-lift command is output from the control device 50.

A third graph illustrated in FIG. 7(C) illustrates the relationship between the time [sec.] from the start of the auto-excavation control and the boom angle $\alpha$ [deg]. The boom angle $\alpha$ is detected by the boom angle sensor 33.

A fourth graph illustrated in FIG. 7(D) illustrates the relationship between the time [sec.] from the start of the auto-excavation control and the bottom pressure Pb [MPa] of the boom cylinder 18. The bottom pressure Pb is detected by the pressure sensor 35.

A fifth graph illustrated in FIG. 7(E) illustrates the relationship between the time [sec.] from the start of the auto-excavation control and the command value [%] of the auto-tilt command output from the control device 50. A state in which the command value of the auto-tilt command is 0[%] indicates that the opening degree of the bucket control valve 24 for causing the bucket 13 to perform the tilt operation is in a fully closed state. When the command value of the auto-tilt command increases from 0[%], the opening degree of the bucket control valve 24 also increases. A state in which the command value of the auto-tilt command is 100[%] indicates that the opening degree of the bucket control valve 24 for causing the bucket 13 to perform the tilt operation is in a fully open state. The state in which the command value of the auto-tilt command is 0[%] includes a state in which the auto-tilt command is not output from the control device 50. The state in which the command value of the auto-tilt command is higher than 0[%] includes a state in which the auto-tilt command is output from the control device 50.

A sixth graph illustrated in FIG. 7(F) illustrates the relationship between the time [sec.] from the start of the auto-excavation control and the bucket angle $\beta$. The bucket angle $\beta$ is detected by the bucket angle sensor 34.

A seventh graph illustrated in FIG. 7(G) illustrates the relationship between the time [sec.] from the start of the auto-excavation control and the bucket angular velocity $\beta v$. The bucket angular velocity $\beta v$ is detected by the bucket angle sensor 34.

An eighth graph illustrated in FIG. 7(H) illustrates the relationship between the time [sec.] from the start of the auto-excavation control and the command value [%] of the clutch command output from the control device 50 to control the degree of engagement of the clutch 25. A state in which the command value of the clutch command is 0[%] indicates a state in which the degree of engagement of the clutch 25 is 0%, that is, a state in which the clutch 25 is in an open state. When the command value of the clutch command increases from 0[%], the degree of engagement of the clutch 25 also increases. A state in which the command value of the clutch command is higher than 0[%] and lower than 100[%] indicates a partial engagement state in which the degree of engagement of the clutch 25 is higher than 0[%] and lower than 100 [%]. A state in which the command value of the clutch command is 100[%] indicates a state in which the degree of engagement of the clutch 25 is 100%, that is, a state in which the clutch 25 is in a complete engagement state.

When the auto-excavation start switch 38 is operated by the operator, the auto-excavation control is started at time t0. As illustrated in FIG. 6(A), the posture of the working equipment 6 is adjusted so that the bucket 13 gets close to or comes into contact with the ground GR. The wheel loader 1 moves forward at a vehicle speed Vo toward the target ET.

At time t1, the bucket 13 is inserted into the target ET. When the bucket 13 is inserted into the target ET, the vehicle speed Vc decreases and the bottom pressure Pb increases.

At time t2 after the time t1, the auto-lift operation is started. The control device 50 outputs the auto-lift command for causing the boom 12 to perform the auto-lift operation at the time t2 when a predetermined auto-lift start condition is satisfied. The auto-lift start condition includes a condition that the vehicle speed Vc is lower than a predetermined vehicle speed determination value d and the bottom pressure Pb is higher than a predetermined pressure determination value b. As an example, the vehicle speed determination value d is 3 [km/h], and the pressure determination value b is 5 [MPa]. When the boom 12 performs the lift operation, a load is applied to the wheel 28, and the slip of the wheel 28 is prevented.

Note that, in the embodiment, the command value of the auto-lift command is decreased at time t3 after the time t2.

At time t4 after the time t3, the auto-tilt operation is started. The control device 50 outputs the auto-tilt command for causing the bucket 13 to perform the auto-tilt operation at the time t4 when a predetermined auto-tilt start condition is satisfied. The auto-tilt start condition includes a condition that the vehicle speed Vc is lower than a predetermined vehicle speed determination value k and the bottom pressure Pb is higher than a predetermined pressure determination value j. As an example, the vehicle speed determination value k is 1.45 [km/h], and the pressure determination value j is 16 [MPa].

In the embodiment, the control device 50 starts the auto-tilt operation after ending the auto-lift operation. After stopping the output of the auto-lift command, the control device 50 starts the output of the auto-tilt command.

When the bucket 13 performs the auto-tilt operation, the bucket angle β and the bucket angular velocity βv increase. Also, when the bucket 13 performs the auto-tilt operation, the bottom pressure Pb increases. When the bucket 13 performs the auto-tilt operation, the vehicle speed Vc decreases. A part of the target ET is excavated by the auto-tilt operation of the bucket 13, and a space is formed in front of the wheel 28. As a result, the vehicle speed Vc increases.

At time t5 after the time t4, the auto-tilt operation ends. The control device 50 stops the output of the auto-tilt command at the time t5 when a predetermined auto-tilt end condition is satisfied. The auto-tilt end condition includes a condition that the vehicle speed Vc is higher than a predetermined vehicle speed determination value n and the increase amount of the bottom pressure Pb from the time t4 when the auto-tilt operation is started is higher than a predetermined pressure determination value m. As an example, the vehicle speed determination value n is 1.3 [km/h], and the pressure determination value m is 3 [MPa].

In the embodiment, the control device 50 starts the auto-lift operation after ending the auto-tilt operation. After stopping the output of the auto-tilt command, the control device 50 starts the output of the auto-lift command.

At time t6 after the time t5, the auto-tilt start condition is satisfied again. At the time t6 when the auto-tilt start condition is satisfied, the control device 50 stops the output of the auto-lift command and starts the output of the auto-lift command.

The control device 50 outputs the auto-lift command and the auto-tilt command so that the auto-lift operation and the auto-tilt operation are repeated while outputting the forward movement command to move the travel device 5 forward.

For example, in a case where the bucket 13 is strongly pressed against the target ET by the forward movement of the wheel loader 1, a situation in which the wheel loader 1 cannot move may occur. That is, in a case where the bucket 13 is strongly pressed against the target ET, the bucket 13 cannot perform the auto-tilt operation, or the travel device 5 cannot move forward. For example, in the period between the time t6 and time t7 illustrated in FIG. 7(A) to FIG. 7(H), a situation occurs in which the bucket 13 cannot move, the bucket angular velocity βv decreases, and the vehicle speed Vc approaches 0. Also, a situation occurs in which not only the bucket 13 but also the boom 12 cannot move, the boom angle α does not change, and the bottom pressure Pb reaches relief pressure Pr.

In the embodiment, the control device 50 outputs the clutch command such that the degree of engagement of the clutch 25 decreases when a clutch control start condition in which a state in which the bucket angular velocity βv is lower than a predetermined speed determination value s continues for a specified time ts or longer is satisfied. As an example, the speed determination value s is 4 [deg/sec.], and the specified time ts is 0.5 [sec.].

In the example illustrated in FIG. 7(A) to FIG. 7(H), at the time t7 after the time t6, the clutch control for decreasing the degree of engagement of the clutch 25 is started. The control device 50 outputs the clutch command for decreasing the degree of engagement of the clutch 25 at the time t7 when the clutch control start condition is satisfied.

In the embodiment, the degree of engagement of the clutch 25 is gradually decreased from the time t7 to time t8 after the time t7. As an example, a decrease rate u of the degree of engagement per unit time is 0.18 [%/sec.]. Also, the degree of engagement of the clutch 25 is controlled so that the degree of engagement does not fall below a predetermined lower limit w. As an example, the lower limit w is 1[%].

As the degree of engagement of the clutch 25 is gradually decreased, the power distributed to the drive device 7 increases, and the bucket 13 starts to move. In the example illustrated in FIG. 7(A) to FIG. 7(H), the bucket 13 starts to move at time t9 after the time t8, and the bucket angular velocity βv gradually increases. The bucket 13 can get out of the situation of being unable to move. Also, a part of the target ET is excavated by the auto-tilt operation of the bucket 13, and a space is formed in front of the wheel 28. As a result, the travel device 5 also starts to move, and the vehicle speed Vc starts to increase.

When a clutch control end condition is satisfied, the control device 50 outputs the clutch command for increasing the degree of engagement of the clutch 25. The clutch control end condition may be a condition that a predetermined time has elapsed from the time t7 when the clutch control is started. The clutch control end condition may be a condition that a state in which the bucket angular velocity βv is higher than a predetermined speed determination value y continues for a specified time ty or longer. As an example, the speed determination value y is 1 [deg/sec.], and the specified time ty is 0.5 [sec.]. Note that the clutch control end condition may be a condition that the bucket angular velocity βv is higher than 0 [deg/sec.]. In the example illustrated in FIG. 7(A) to FIG. 7(H), the clutch control ends at time t10 after a predetermined time has elapsed from the time t7. The time t10 is later than the time t9. At the time t10, the bucket angular velocity Bv is higher than the speed determination value s.

In the embodiment, the degree of engagement of the clutch 25 is gradually increased from the time t10 to time t11 after the time t10. As an example, an increase rate v of the degree of engagement per unit time is 0.18 [%/sec.]. Also, the degree of engagement of the clutch 25 is controlled so that the degree of engagement does not exceed a predetermined upper limit z. As an example, the upper limit z is the degree of engagement before the degree of engagement of the clutch 25 is decreased (the degree of engagement at the time t7).

[Control Method for Work Vehicle]

Figure 8:
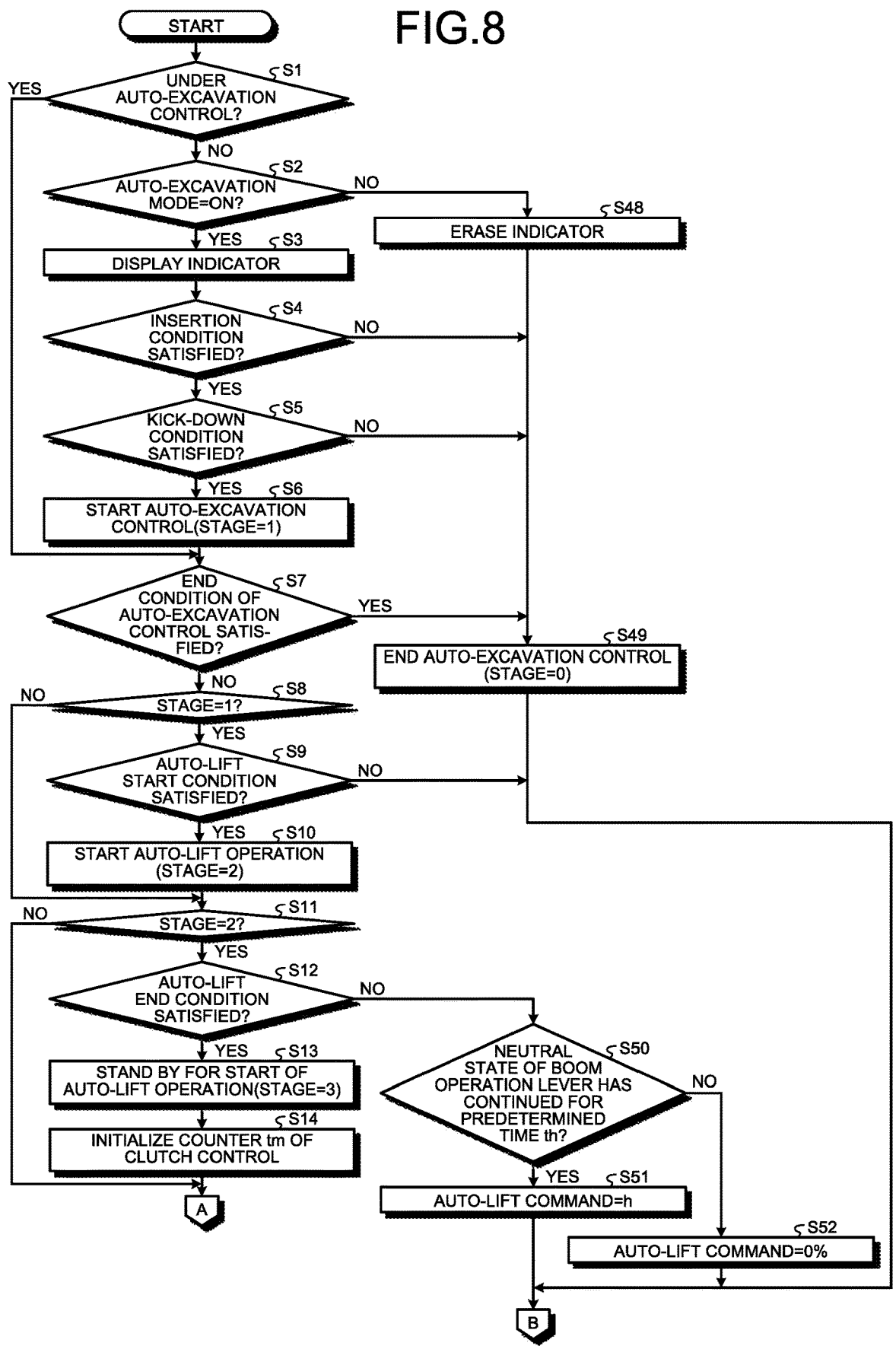
FIG. 8 is a flowchart illustrating the control method for the work vehicle according to the embodiment.
Figure 9:
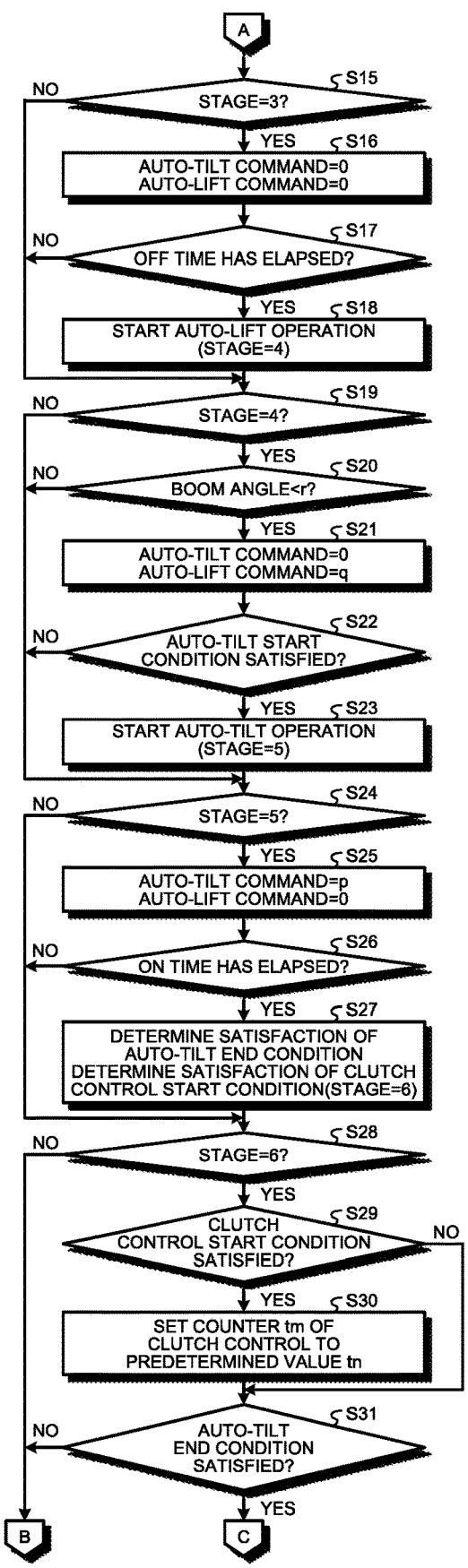
FIG. 9 is a flowchart illustrating the control method for the work vehicle according to the embodiment.
Figure 10:
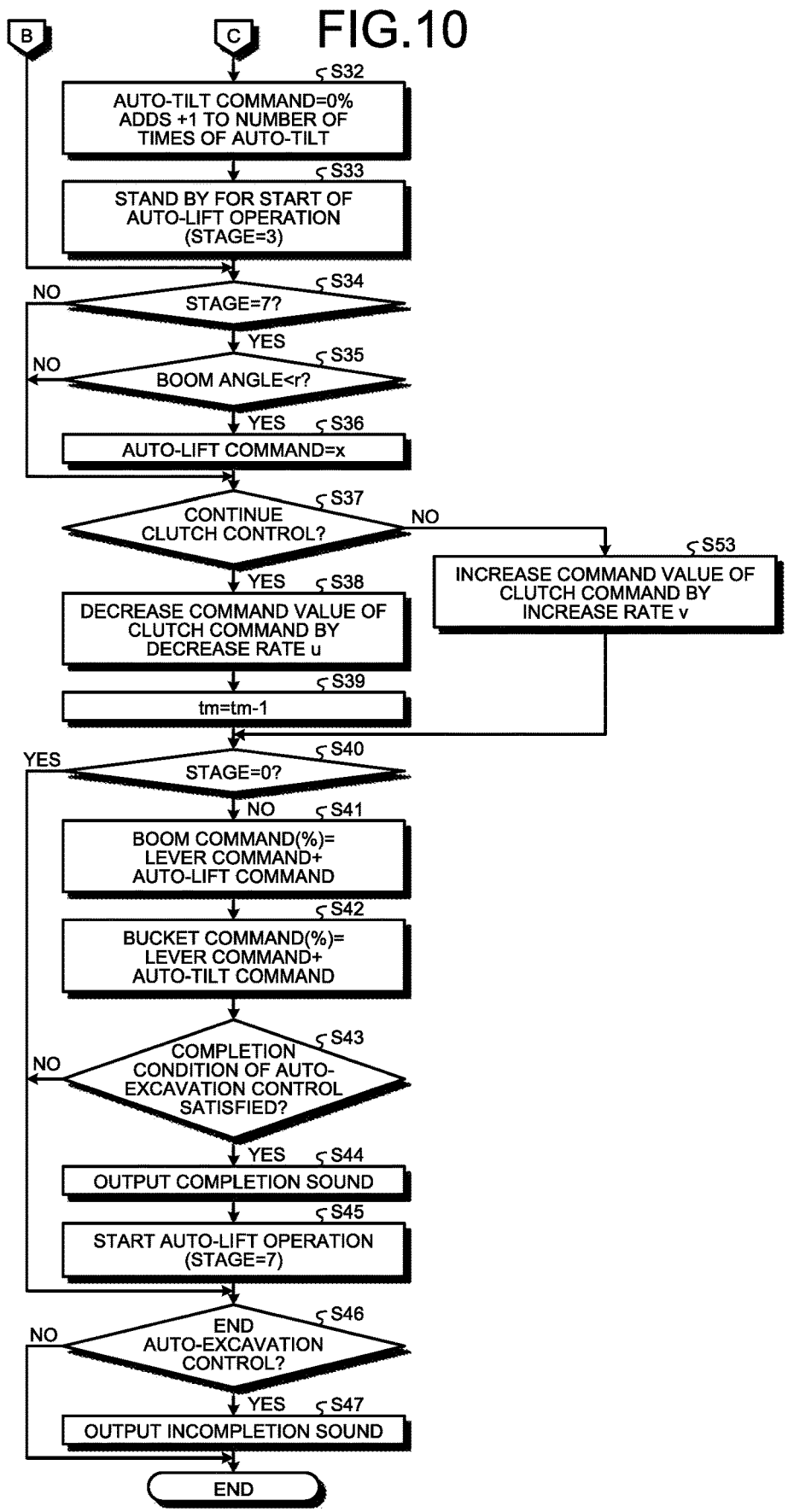
FIG. 10 is a flowchart illustrating the control method for the work vehicle according to the embodiment.

FIGS. 8, 9, and 10 are flowcharts illustrating a control method for the wheel loader 1 according to the embodiment.

In the embodiment, the control device 50 defines a plurality of stages indicating the states of the auto-excavation control. The control device 50 defines stages 0 to 7 as stages.

The stage 0 indicates a standby state and an end state of the auto-excavation control. The stage 1 indicates a determination state of a start condition for the auto-excavation control. The stage 2 indicates an execution state of the auto-lift operation. The stage 3 indicates a start standby state of the auto-lift operation. The stage 4 indicates an execution state of the auto-lift operation. The stage 5 indicates an execution state of the auto-tilt operation. The stage 6 indicates a determination state of the auto-tilt end condition and a determination state of the clutch control start condition. The stage 7 indicates an execution state of the auto-lift operation.

The control device 50 determines whether or not the wheel loader 1 is under auto-excavation control (Step S1).

In a case where it is determined in Step S1 that the auto-excavation control is not being performed (Step S1: No), the control device 50 determines whether or not the auto-excavation mode is ON. That is, the control device 50 determines whether or not the auto-excavation mode is valid (Step S2).

In a case of acquiring the auto-excavation start signal from the auto-excavation start switch 38, the control device 50 determines that the auto-excavation mode is ON.

In a case where it is determined in Step S2 that the auto-excavation mode is ON (Step S2, Yes), the control device 50 causes the display unit 40 of the interface device 37 to display an indicator indicating that the auto-excavation mode is ON (Step S3).

After the indicator is displayed on the display unit 40, the control device 50 determines whether or not an insertion condition of the wheel loader 1 into the target ET is satisfied (Step S4).

The insertion condition is a condition that the wheel loader 1 moves forward and the bucket 13 is close to or in contact with the ground GR. As illustrated in FIG. 6(A), in a case where the auto-excavation control is executed, the posture of the working equipment 6 is adjusted so that the blade tip portion 13T of the bucket 13 gets close to or comes into contact with the ground GR. The wheel loader 1 moves forward toward the target ET in a state where the posture of the working equipment 6 has been adjusted.

In a case where the forward movement command to the travel device 5 is output, the control device 50 can determine that the wheel loader 1 is moving forward. In a case where the detection value of the boom angle sensor 33 is lower than a predetermined angle determination value a, the control device 50 can determine that the bucket 13 is close to or in contact with the ground GR. As an example, the angle determination value a is −30 [deg]. As a result, the control device 50 can determine whether or not the insertion condition of the wheel loader 1 is satisfied.

In a case where it is determined in Step S4 that the insertion condition is satisfied (Step S4: Yes), the control device 50 determines whether or not a kick-down condition is satisfied (Step S5).

The kick-down condition is a condition that the transmission 27 is set to an automatic speed change mode and a kick-down command is input into the control device or a condition that the speed stage of the transmission 27 is set to the first speed stage and the kick-down switch 32 is operated.

In a case where it is determined in Step S5 that the kick-down condition is satisfied (Step S5: Yes), the control device 50 shifts the state of the auto-excavation control to the stage 1 in order to start the auto-excavation control (Step S6).

The control device 50 determines whether or not an end condition of the auto-excavation control is satisfied (Step S7).

In the embodiment, the end condition of the auto-excavation control includes at least one of a condition that the auto-excavation mode is OFF, a condition that a different control command from the forward movement command is output to the transmission 27, a condition that a predetermined time (for example, 0.5 [sec.]) has elapsed since the bucket 13 has reached a tilt end, a condition that the boom angle α is equal to or higher than a predetermined angle (for example, 0 [deg]), a condition that the working equipment 6 is locked, a condition that a failure has occurred in the control system 60 related to the working equipment 6, a condition that the operation amount of the boom operation lever 29 for causing the boom 12 to perform the lowering operation is larger than a predetermined amount, and a condition that the operation amount of the bucket operation lever 30 for causing the bucket 13 to perform the dumping operation is larger than a predetermined amount.

The tilt end refers to a position in the extension/retraction range of the bucket cylinder 19 where the bucket cylinder 19 extends the most and the bucket 13 cannot perform the tilt operation. The tilt end is detected by the bucket angle sensor 34.

In a case where it is determined in Step S7 that the end condition of the auto-excavation control is not satisfied (Step S7: No), the control device 50 determines whether or not the state of the auto-excavation control is the stage 1 (Step S8).

In a case where it is determined in Step S8 that the state of the auto-excavation control is the stage 1 (Step S8: Yes), the control device 50 determines whether or not an auto-lift start condition is satisfied (Step S9).

The auto-lift start condition is a condition for starting the auto-lift operation of the boom 12. In the embodiment, the auto-lift start condition is a condition that a state in which the vehicle speed Vc of the travel device 5 is lower than the predetermined vehicle speed determination value d continues for a predetermined time tb or longer, a state in which the bottom pressure Pb of the boom cylinder 18 is higher than the predetermined pressure determination value b continues for a predetermined time ta or longer, and the boom angle α is lower than a predetermined angle determination value c.

As an example, the vehicle speed determination value d is 3 [km/h], the pressure determination value b is [MPa], the angle determination value c is −10 [deg], the predetermined time ta is 0.1 [sec.], and the predetermined time tb is 0.1 [sec.].

In a case where it is determined in Step S9 that the auto-lift start condition is satisfied (Step S9: Yes), the control device 50 shifts the state of the auto-excavation control to the stage 2 in order to start the auto-lift operation (Step S10).

The control device 50 determines whether or not the state of the auto-excavation control is the stage 2 (Step S11).

In a case where it is determined in Step S11 that the state of the auto-excavation control is the stage 2 (Step S11: Yes), the control device 50 determines whether or not an auto-lift end condition is satisfied (Step S12).

The auto-lift end condition is a condition for ending the auto-lift operation of the boom 12. In the embodiment, the auto-lift end condition is a condition that the increase amount of the boom angle α from the time when the boom 12 starts the auto-lift operation is larger than a predetermined angle determination value f or a condition that a state in which the bottom pressure Pb is higher than a predetermined pressure determination value g continues for a predetermined time tc or longer.

As an example, the angle determination value f is 2 [deg], the pressure determination value g is 30 [MPa], and the predetermined time tc is 0.1 [sec.].

In a case where it is determined in Step S12 that the auto-lift end condition is satisfied (Step S12: Yes), the control device 50 shifts the state of the auto-excavation control to the stage 3 in order to stand by for the start of the auto-lift operation (Step S13).

The control device 50 initializes a counter tm of clutch control of the clutch 25 (Step S14). That is, the control device 50 sets the counter tm to 0.

The control device 50 determines whether or not the state of the auto-excavation control is the stage 3 (Step S15).

In a case where it is determined in Step S15 that the state of the auto-excavation control is the stage 3 (Step S15: Yes), the control device 50 sets the command value of the auto-tilt command to 0[%] and sets the command value of the auto-lift command to 0[%] (Step S16).

Figure 11:
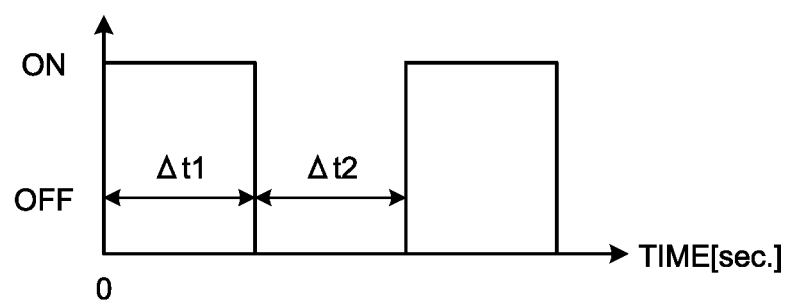
FIG. 11 is a diagram for describing an auto-tilt cycle table according to the embodiment.

FIG. 11 is a diagram for describing an auto-tilt cycle table according to the embodiment. The auto-tilt command is output on the basis of the auto-tilt cycle table. The auto-tilt cycle table is started when the stage 3 is started. As illustrated in FIG. 11, the auto-tilt cycle table includes an ON time Δt1 for opening the bucket control valve 24 to cause the bucket 13 to perform the tilt operation and an OFF time Δt2 for closing the bucket control valve 24. In the auto-tilt cycle table, a plurality of ON times Δt1 and a plurality of OFF times Δt2 are set on the basis of the number of times of the auto-tilt operation scheduled to be executed. The auto-tilt cycle table is stored in advance in the control device 50.

In the embodiment, at least four ON times Δt1 and four OFF times Δt2 are repeated. Note that FIG. 11 schematically illustrates two ON times Δt1 and one OFF time Δt2. The first ON time Δt1 is set to 0 [sec.]. The first OFF time Δt2 is set to 0.4 [sec.]. The second ON time Δt1 is set to 0.6 [sec.]. The second OFF time Δt2 is set to [sec.]. The third ON time Δt1 is set to 0.6 [sec.]. The third OFF time Δt2 is set to 0.3 [sec.]. The fourth ON time Δt1 is set to 0.6 [sec.]. The fourth OFF time Δt2 is set to 0.2 [sec.]. Note that the fifth and subsequent ON times Δt1 are set to 0.6 [sec.], and the fifth and subsequent OFF times Δt2 are set to 0.2 [sec.].

The control device 50 determines whether or not the OFF time Δt2 has elapsed since the auto lift end condition is satisfied (Step S17).

In the embodiment, the control device 50 does not start the auto-tilt operation until the OFF time Δt2 elapses after the previous auto-tilt end condition of the boom 12 is satisfied.

In a case where it is determined in Step S17 that the OFF time Δt2 has elapsed (Step S17: Yes), the control device 50 shifts the state of the auto-excavation control to the stage 4 in order to execute the auto-lift operation (Step S18).

The control device 50 determines whether or not the state of the auto-excavation control is the stage 4 (Step S19).

In a case where it is determined in Step S19 that the state of the auto-excavation control is the stage 4 (Step S19: Yes), the control device 50 determines whether or not the boom angle α is lower than a predetermined angle determination value r (Step S20).

As an example, the angle determination value r is −33 [deg].

In a case where it is determined in Step S20 that the boom angle α is lower than the angle determination value r (Step S20: Yes), the control device 50 sets the command value of the auto-tilt command to 0, and sets the command value of the auto-lift command to a command value q, which is higher than 0 (Step S21).

As an example, the command value q is 80[%].

Subsequently, the control device 50 determines whether or not the auto-tilt start condition is satisfied (Step S22).

The auto-tilt start condition is a condition for starting the auto-tilt operation of the bucket 13. The auto-tilt start condition is the same as the auto-lift end condition. In the embodiment, the auto-tilt start condition is a condition that a state in which the vehicle speed Vc is lower than the predetermined vehicle speed determination value k continues for a predetermined time td or longer, and a state in which the bottom pressure Pb is higher than the predetermined pressure determination value j continues for a predetermined time te or longer.

As an example, the vehicle speed determination value k is 1.45 [km/h], the pressure determination value j is 16 [MPa], the predetermined time td is 0.1 [sec.], and the predetermined time te is 0.1 [sec.].

In a case where it is determined in Step S22 that the auto-tilt start condition is satisfied (Step S22: Yes), the control device 50 shifts the state of the auto-excavation control to the stage 5 in order to execute the auto-tilt operation (Step S23).

The control device 50 determines whether or not the state of the auto-excavation control is the stage 5 (Step S24).

In a case where it is determined in Step S24 that the state of the auto-excavation control is the stage 5 (Step S24: Yes), the control device 50 sets the command value of the auto-lift command to 0 and sets the command value of the auto-tilt command to a command value p, which is higher than 0 (Step S25).

As an example, the command value p is 80[%]. When the auto-tilt command is output, the bucket 13 starts the auto-tilt operation.

The control device 50 determines whether or not the ON time Δt1 has elapsed since the auto-tilt start condition is satisfied (Step S26).

In a case where it is determined in Step S26 that the ON time Δt1 has elapsed (Step S26: Yes), the control device 50 shifts the state of the auto-excavation control to the stage 6 in order to determine the satisfaction of the auto-tilt end condition and determine the satisfaction of the clutch control start condition (Step S27).

The control device 50 determines whether or not the state of the auto-excavation control is the stage 6 (Step S28).

In a case where it is determined in Step S28 that the state of the auto-excavation control is the stage 6 (Step S28: Yes), the control device 50 determines whether or not the clutch control start condition is satisfied (Step S29).

The clutch control start condition is a condition for starting the decrease of the degree of engagement of the clutch 25. In the embodiment, the clutch control start condition is a condition that a state in which the bucket angular velocity βv is lower than the predetermined speed determination value s is continued for the specified time ts or longer.

As an example, the speed determination value s is 4 [deg/sec.], and the specified time ts is 0.5 [sec.].

In a case where it is determined in Step S29 that the clutch control start condition is satisfied (Step S29: Yes), the control device 50 sets the counter tm of clutch control of the clutch 25 to a predetermined value tn (Step S30).

As an example, the predetermined value tn is 50.

The control device 50 determines whether or not the auto-tilt end condition is satisfied (Step S31).

The auto-tilt end condition is a condition for ending the auto-tilt operation. In the embodiment, the auto-tilt end condition is a condition that the bottom pressure Pb is higher than the pressure determination value j and the increase amount of the bottom pressure Pb from the time when the bucket 13 starts the auto-tilt operation is larger than the predetermined pressure determination value m or a condition that a state in which the vehicle speed Vc is higher than the vehicle speed determination value n continues for a predetermined time tf or longer.

As an example, the vehicle speed determination value n is 1.3 [km/h], the pressure determination value m is 3 [MPa], and the predetermined time tf is 0.1 [sec.].

In a case where it is determined in Step S31 that the auto-tilt end condition is satisfied (Step S31: Yes), the control device 50 sets the command value of the auto-tilt command to 0[%]. Also, the control device 50 adds 1 to the current number of times of the auto-tilt operation (Step S32).

When the auto-tilt command is set to 0[%], the operation of the bucket cylinder 19 stops, and the auto-tilt operation of the bucket 13 ends.

In order to stand by for the start of the auto-lift operation, the control device 50 shifts the state of the auto-excavation control to the stage 3 (Step S33).

The control device 50 determines whether or not the state of the auto-excavation control is the stage 7 (Step S34).

In a case where it is determined in Step S34 that the state of the auto-excavation control is the stage 7 (Step S34: Yes), the control device 50 determines whether or not the boom angle α is lower than the angle determination value r (Step S35).

In a case where it is determined in Step S35 that the boom angle α is lower than the angle determination value r (Step S35: Yes), the control device 50 sets the command value of the auto-lift command to a command value x (Step S36).

As an example, the command value x is 80[%].

The control device 50 determines whether or not the clutch control of the clutch 25 is continued (Step S37).

In the embodiment, the control device 50 determines that the clutch control is continued in a case where the counter tm is higher than 0.

In a case where it is determined in Step S37 that the control of the clutch 25 is continued (Step S37: Yes), the control device 50 decreases the command value of the clutch command by the decrease rate u [%/sec] (Step S38). The decrease rate u indicates a decrease rate of the degree of engagement of the clutch 25 per unit time. As an example, the decrease rate u is 0.18 [%/sec]. Also, the clutch command (the degree of engagement of the clutch 25) is controlled so that the value does not fall below the predetermined lower limit w. As an example, the lower limit w is 1[%].

The control device 50 subtracts 1 from the counter tm (Step S39).

The control device 50 determines whether or not the state of the auto-excavation control is the stage 0 (Step S40).

In a case where it is determined in Step S40 that the state of the auto-excavation control is not the stage 0 (Step S40: No), the control device 50 sets a boom command to a value obtained by adding the current auto-lift command to a current lever command (Step S41).

In addition, the control device 50 sets a bucket command to a value obtained by adding the current auto-tilt command to the current lever command (Step S42).

The lever command is a control command for determining the opening degree of the boom control valve 23 or the opening degree of the bucket control valve 24 obtained from the operation amount of the boom operation lever 29 or the bucket operation lever 30. In a case where the respective operation levers (29 and 30) are not operated, the lever command becomes 0.

The control device 50 determines whether or not a completion condition of the auto-excavation control is satisfied (Step S43).

The completion condition of the auto-excavation control is a condition that the excavation by means of the auto-excavation control is completed. In the embodiment, the completion condition of the auto-excavation control is a condition that a predetermined time tg has elapsed after the bucket 13 reaches the tilt end in the auto-excavation control. As an example, the predetermined time tg is 0.5 [sec.].

In a case where it is determined in Step S43 that the completion condition of the auto-excavation control is satisfied (Step S43: Yes), the control device 50 causes the sound output unit 39 of the interface device 37 to output a completion sound indicating that the excavation by means of the auto-excavation control is completed (Step S44).

The sound is output from the sound output unit 39 to enable the operator of the wheel loader 1 to know that the excavation by means of the auto-excavation control has been completed.

In order to start the auto-lift operation after the detection of the tilt end, the control device 50 shifts the state of the auto-excavation control to the stage 7 (Step S45).

The control device 50 determines whether or not to end the auto-excavation control (Step S46).

For example, in a case where the operator of the wheel loader 1 cancels the auto-excavation mode, in a case where the operator operates the boom operation lever 29 to cause the boom 12 to perform the lowering operation, or in a case where the operator operates the bucket operation lever 30 to cause the bucket 13 to perform the dumping operation, the operation of the operator is prioritized, and the auto-excavation control by means of the control device 50 ends.

In a case where it is determined in Step S46 that the auto-excavation control is not to be ended (Step S46: No), the control device 50 returns to the start and executes the processing of Step S1 and subsequent steps.

In a case where it is determined in Step S46 that the auto-excavation control is to be ended (Step S46: Yes), the control device 50 ends the auto-excavation control, and causes the sound output unit 39 of the interface device 37 to output an incompletion sound indicating that the auto-excavation control is ended in an incomplete manner (Step S47).

The incompletion sound is output from the sound output unit 39 to enable the operator of the wheel loader 1 to know that the auto-excavation control has been ended halfway.

The completion sound output in Step S44 is made different from the incompletion sound output in Step S47. By doing so, the operator can distinguish the case where the excavation by means of the auto-excavation control has been completed from the case where the auto-excavation control has been ended in an incomplete manner. After the end of Step S47, the control device 50 returns to the start and executes the processing of Step S1 and subsequent steps.

In a case where it is determined in Step S1 that the auto-excavation control is being performed (Step S1: Yes), the control device 50 executes the processing of Step S7 and subsequent steps.

In a case where it is determined in Step S2 that the auto-excavation mode is OFF (Step S2: No), the control device 50 erases the indicator indicating that the auto-excavation mode is ON from the display unit 40 of the interface device 37 (Step S48).

After executing the processing of Step S48, the control device 50 shifts the state of the auto-excavation control to the stage 0 in order to end the auto-excavation control (Step S49).

After the processing of Step S49 is ended, the control device 50 executes the processing of Step S34 and subsequent steps.

In a case where it is determined in Step S4 that the insertion condition is not satisfied (Step S4: No), the control device 50 does not execute the auto-excavation control and executes the processing in Step S34 and subsequent steps.

In a case where it is determined in Step S5 that the kick-down condition is not satisfied (Step S5: No), the control device 50 does not execute the auto-excavation control and executes the processing in Step S34 and subsequent steps.

In a case where it is determined in Step S7 that the end condition of the auto-excavation control is satisfied (Step S7: Yes), the control device 50 does not execute the auto-excavation control and executes the processing in Step S34 and subsequent steps.

In a case where it is determined in Step S8 that the state of the auto-excavation control is not the stage 1 (Step S8: No), the control device 50 executes the processing of Step S11 and subsequent steps.

In a case where it is determined in Step S9 that the auto-lift start condition is not satisfied (Step S9: No), the control device 50 does not start the auto-lift operation and executes the processing of Step S34 and subsequent steps.

In a case where it is determined in Step S11 that the state of the auto-excavation control is not the stage 2 (Step S11: No), the control device 50 executes the processing of Step S15 and subsequent steps.

In a case where it is determined in Step S12 that the auto-lift end condition is not satisfied (Step S12: No), the control device 50 does not end the auto-lift operation and determines whether or not a neutral state of the boom operation lever 29 has continued for a predetermined time th (Step S50).

As an example, the predetermined time th is 0.1 [sec.].

In a case where it is determined in Step S50 that the neutral state of the boom operation lever 29 has continued for the predetermined time th (Step S50: Yes), the control device 50 sets the command value of the auto-lift command to a command value h (Step S51).

As an example, the command value h is 80[%].

In a case where it is determined in Step S50 that the neutral state of the boom operation lever 29 has not continued for the predetermined time th (Step S50: No), it means that the operator of the wheel loader 1 has operated the boom operation lever 29. The control device 50 sets the auto-lift command to 0[%] in order to prioritize the operation of the operator (Step S52).

After executing the processing of Step S51 or Step S52, the control device 50 executes the processing of Step S34 and subsequent steps.

In a case where it is determined in Step S15 that the state of the auto-excavation control is not the stage 3 (Step S15: No), the control device 50 executes the processing of Step S19 and subsequent steps.

In a case where it is determined in Step S17 that the OFF time $\Delta t2$ has not elapsed (Step S17: No), the control device 50 executes the processing of Step S19 and subsequent steps.

In a case where it is determined in Step S19 that the state of the auto-excavation control is not the stage 4 (Step S19: No), the control device 50 executes the processing of Step S24 and subsequent steps.

In a case where it is determined in Step S20 that the boom angle α is equal to or higher than the angle determination value r (Step S20: No), the control device 50 executes the processing of Step S24 and subsequent steps.

In a case where it is determined in Step S22 that the auto-tilt start condition is not satisfied (Step S22: No), the control device 50 executes the processing of Step S24 and subsequent steps.

In a case where it is determined in Step S24 that the state of the auto-excavation control is not the stage 5 (Step S24: No), the control device 50 executes the processing of Step S28 and subsequent steps.

In a case where it is determined in Step S26 that the ON time $\Delta t1$ has not elapsed (Step S26: No), the control device 50 executes the processing of Step S28 and subsequent steps.

In a case where it is determined in Step S28 that the state of the auto-excavation control is not the stage 6 (Step S28: No), the control device 50 executes the processing of Step S34 and subsequent steps.

In a case where it is determined in Step S29 that the clutch control condition is not satisfied (Step S29: Yes), the control device 50 does not execute the processing of Step S30 and executes the processing of Step S31 and subsequent steps.

In a case where it is determined in Step S34 that the state of the auto-excavation control is not the stage 7 (Step S34: No), the control device 50 executes the processing of Step S37 and subsequent steps.

In a case where it is determined in Step S35 that the boom angle α is equal to or higher than the angle determination value r (Step S35: No), the control device 50 executes the processing of Step S37 and subsequent steps.

In a case where it is determined in Step S37 that the clutch control of the clutch 25 is not continued (Step S37: No), the control device 50 increases the command value of the clutch command by the increase rate v [%/sec] (Step S53). The increase rate v indicates an increase rate of the degree of engagement of the clutch 25 per unit time. As an example, the increase rate v is 0.18 [%/sec.]. Also, the command value of the clutch command (the degree of engagement of the clutch 25) is controlled so that the value does not exceed the predetermined upper limit z. As an example, the upper limit z is the degree of engagement before the degree of engagement of the clutch 25 is decreased. After executing the processing of Step S53, the control device 50 executes the processing of Step S40 and subsequent steps.

In a case where it is determined in Step S40 that the state of the auto-excavation control is the stage 0 (Step S40: Yes), the control device 50 executes the processing of Step S46 and subsequent steps.

In a case where it is determined in Step S43 that the completion condition of the auto-excavation control is not satisfied (Step S43: No), the control device 50 executes the processing of Step S46 and subsequent steps.

[Effects]

As described above, in the embodiment, the degree of engagement of the clutch 25 is controlled on the basis of the state of the working equipment 6. As the degree of engagement of the clutch 25 is increased, the traction force of the wheel loader 1 (the grip force of the wheel 28 with respect to the ground GR) is increased. Thus, the wheel loader 1 can excavate the target ET. In a case where the working equipment 6 and the wheel 28 are strongly pressed against the target ET by the forward movement of the wheel loader 1, and a situation in which the wheel loader 1 cannot move occurs, the degree of engagement of the clutch 25 is decreased, whereby the wheel loader 1 gets out of a state where the traction force has reached the maximum. By doing so, the bucket 13 can perform the tilt operation. In this manner, by decreasing the degree of engagement of the clutch 25, the wheel loader 1 can get out of a situation of being unable to move in excavation of the target ET.

In the embodiment, the control device 50 controls the degree of engagement of the clutch 25 on the basis of the operation speed of the working equipment 6. When the working equipment 6 and the wheel 28 are strongly pressed against the target ET by the forward movement of the wheel loader 1, the working equipment 6 cannot move. In a case where it is determined that the working equipment 6 cannot move on the basis of the operation speed of the working equipment 6, the degree of engagement of the clutch 25 is decreased, whereby the working equipment 6 can get out of a situation of being unable to move.

When the clutch control end condition is satisfied, the control device 50 outputs the clutch command for decreasing the degree of engagement of the clutch 25. In the embodiment, the clutch control start condition is a condition that a state in which the operation speed of the working equipment 6 is lower than the speed determination value s continues for the specified time is or longer. By defining the clutch control start condition, the control device 50 can appropriately decrease the degree of engagement of the clutch 25.

The power generated by the power source 20 is distributed to the travel device 5 and the drive device 7 by the power take-off 21. When a situation in which the wheel loader 1 cannot move occurs and the degree of engagement of the clutch 25 is decreased, the power distributed to the drive device 7 that drives the working equipment 6 increases. As a result, the working equipment 6 and the wheel 28 can get out of the situation of being unable to move.

In the excavation operation, the bucket 13 of the working equipment 6 is inserted into the target ET. The control device 50 can appropriately control the degree of engagement of the clutch 25 so that the bucket 13 that cannot move can move on the basis of the bucket angular velocity $\beta v$.

The control device 50 starts the tilt operation of the bucket 13 when the auto-tilt start condition defined on the basis of the vehicle speed Vc of the travel device 5 and the bottom pressure Pb of the boom cylinder 18 is satisfied. Also, the control device 50 ends the tilt operation of the bucket 13 when the auto-tilt end condition defined on the basis of the vehicle speed Vs of the travel device 5 and the increase amount of the bottom pressure Pb from the time when the tilt operation is started is satisfied. By doing so, the tilt operation of the bucket 13 is started and ended at the appropriate time.

[Other Embodiments]

In the above-described embodiment, the control device controls the degree of engagement of the clutch 25 on the basis of the bucket angular velocity $\beta v$ as the operation speed of the working equipment 6. The control device 50 may control the degree of engagement of the clutch 25 on the basis of the boom angular velocity $\alpha v$ as the operation speed of the working equipment 6. The control device 50 may control the degree of engagement of the clutch 25 in a case of determining that the boom 12 cannot move on the basis of the boom angular velocity $\alpha v$.

In the above-described embodiment, the control device 50 controls the degree of engagement of the clutch 25 on the basis of the operation speed of the working equipment 6 including at least one of the bucket angular velocity $\beta v$ and the boom angular velocity $\alpha v$ as the state of the working equipment 6. The control device 50 may control the degree of engagement of the clutch 25 on the basis of the pressure of the hydraulic oil in the boom cylinder 18 as the state of the working equipment 6. As described above, when the boom 12 cannot move, a situation occurs in which the bottom pressure Pb of the boom cylinder 18 reaches the relief pressure Pr. The control device 50 may decrease the degree of engagement of the clutch 25 in a case of determining that the pressure of the hydraulic oil in the boom cylinder 18 has reached the relief pressure. Also, the control device 50 may decrease the degree of engagement of the clutch 25 in a case of determining that the pressure of the hydraulic oil in the bucket cylinder 19 has reached the relief pressure.

In the above-described embodiment, the auto-excavation start switch 38 and the kick-down switch 32 may be used at the same time. By using the auto-excavation start switch 38 and the kick-down switch 32 at the same time, the speed stage of the transmission 27 is changed to a low speed stage at the same time as the start of the auto-excavation mode. Thus, the excavation operation is easily and efficiently performed.

REFERENCE SIGNS LIST

1 WHEEL LOADER (WORK VEHICLE)
2 VEHICLE BODY
2F VEHICLE BODY FRONT PORTION
2R VEHICLE BODY REAR PORTION
3 ARTICULATION MECHANISM
4 CAB
5 TRAVEL DEVICE
6 WORKING EQUIPMENT
7 DRIVE DEVICE
8 ARTICULATION CYLINDER
9 SEAT
10 OPERATION LEVER
11 BRACKET
12 BOOM
13 BUCKET
13B BOTTOM PLATE PORTION
13M OPENING PORTION
13T BLADE TIP PORTION
14 BELL CRANK
15 BUCKET LINK

16 BRACKET
17 BRACKET
18 BOOM CYLINDER
19 BUCKET CYLINDER
20 POWER SOURCE
21 POWER TAKE-OFF
22 HYDRAULIC PUMP
23 BOOM CONTROL VALVE
24 BUCKET CONTROL VALVE
25 CLUTCH
26 TORQUE CONVERTER
27 TRANSMISSION
28 WHEEL
28F FRONT WHEEL
28R REAR WHEEL
29 BOOM OPERATION LEVER
30 BUCKET OPERATION LEVER
31 SELECTOR LEVER
32 KICK-DOWN SWITCH
33 BOOM ANGLE SENSOR
34 BUCKET ANGLE SENSOR
35 PRESSURE SENSOR
36 VEHICLE SPEED SENSOR
37 INTERFACE DEVICE
38 AUTO-EXCAVATION START SWITCH
39 SOUND OUTPUT UNIT
40 DISPLAY UNIT
50 CONTROL DEVICE
51 PROCESSOR
52 MAIN MEMORY
53 STORAGE
54 INTERFACE
60 CONTROL SYSTEM
132 BOTTOM SURFACE
AXa TURNING AXIS
AXb TURNING AXIS
AXc TURNING AXIS
AXd TURNING AXIS
AXe TURNING AXIS
AXf TURNING AXIS
AXg TURNING AXIS
AXh TURNING AXIS
CXf ROTATION AXIS
CXr ROTATION AXIS
ET TARGET
GR GROUND
L1 LINE
L2 LINE
L3 LINE
L4 LINE
Pb BOTTOM PRESSURE
Vc VEHICLE SPEED
α BOOM ANGLE
αv BOOM ANGULAR VELOCITY
β BUCKET ANGLE
βv BUCKET ANGULAR VELOCITY

The invention claimed is:

1. A work vehicle comprising:
   a power source;
   a travel device that includes a clutch capable of adjusting a degree of engagement between the power source and a transmission, and travels on a basis of power transmitted from the power source;
   working equipment;
   a drive device that operates the working equipment on a basis of power transmitted from the power source; and
   a control device that outputs a control command for controlling the degree of engagement of the clutch on a basis of a state of the working equipment,
   wherein the state of the working equipment includes an operation speed of the working equipment, and
   wherein the control device outputs the control command such that the degree of engagement decreases when a clutch control start condition is satisfied in which a state in which the operation speed of the working equipment is lower than a speed determination value continues for a specified time or longer.

2. The work vehicle according to claim 1, comprising a power take-off that distributes power from the power source to the travel device and the drive device,
   wherein, as the degree of engagement is decreased, power distributed to the drive device increases.

3. The work vehicle according to claim 1, wherein the working equipment includes a boom and a bucket, and
   wherein the operation speed of the working equipment includes an angular velocity of the bucket.

4. The work vehicle according to claim 3, wherein the drive device includes a boom cylinder that operates the boom and a bucket cylinder that operates the bucket, and
   wherein the control device starts a tilt operation of the bucket on a basis of a traveling speed of the travel device and a pressure of hydraulic oil in the boom cylinder, and ends the tilt operation on a basis of the traveling speed of the travel device and an increase amount of the pressure from a time when the tilt operation is started.

5. A control method for a work vehicle comprising:
   in the work vehicle including working equipment, outputting a control command for performing engagement of a clutch disposed between a power source and a transmission and capable of adjusting a degree of engagement such that power generated in the power source is transmitted to a travel device including the clutch; and
   outputting a control command for decreasing the degree of engagement of the clutch on a basis of a state of the working equipment,
   wherein the state of the working equipment includes an operation speed of the working equipment, and
   wherein the control command is output such that the degree of engagement decreases when a clutch control start condition is satisfied in which a state in which the operation speed of the working equipment is lower than a speed determination value continues for a specified time or longer.

* * * * *